United States Patent [19]
Kemp

[11] 4,013,046
[45] Mar. 22, 1977

[54] ROTARY ENGINE

[76] Inventor: Gail W. Kemp, 9622 Vinewood, Dallas, Tex. 75228

[22] Filed: Jan. 27, 1975

[21] Appl. No.: 544,427

[52] U.S. Cl. .............................. 123/8.27; 418/113; 418/195
[51] Int. Cl.² ...................................... F02B 53/00
[58] Field of Search ............... 123/8.17, 8.27, 8.31; 418/115, 113, 124, 195

[56] References Cited
UNITED STATES PATENTS

| | | | |
|---|---|---|---|
| 974,803 | 11/1910 | Lukacsevics | 123/8.49 |
| 1,332,468 | 3/1920 | Henig et al. | 123/8.03 |
| 1,836,469 | 12/1931 | Hill et al. | 418/195 |
| 1,960,971 | 5/1934 | Fisher | 123/8.27 |
| 3,444,843 | 5/1969 | Sabet | 418/115 |
| 3,477,414 | 11/1969 | Marin | 123/8.27 |
| 3,524,435 | 8/1970 | Hambric | 418/195 UX |
| 3,739,754 | 6/1973 | Nutku | 123/8.27 |

Primary Examiner—Carlton R. Croyle
Assistant Examiner—Michael Koczo, Jr.
Attorney, Agent, or Firm—Howard E. Moore; Gerald G. Crutsinger

[57] ABSTRACT

A rotary engine utilizing hydrocarbon fuel having a circular rotor with one or more spaced pistons which are in sealing relationship with a generally circular torus. One or more compression expansion valves which rotate about an axis tangent to the torus wall are in sealing relation with the rotor and have a combustion chamber formed in the hub thereof. As the valve rotates about an axis, compression and expansion ports alternately communicate with the interior of the torus. One or more divider valves separate the intake and exhaust functions of the cycles and have a rotation about an axis tangent to the torus wall. The divider valves are in sealing relationship with the rotor body with a notch which allows the pistons to pass therethrough. The piston draws a vacuum on the intake valve, pulling gas into the torus and compressing the gas ahead of the piston into the combustion chamber through a compression port. As the rotor rotates, the combustion chamber rotates simultaneously the gas is ignited, and expands against the trailing face of the piston as the expansion ports of the combustion chamber align with the working area of the torus. The gases push the piston away from the compression-expansion valve rotating the rotor, and the piston simultaneously pushes previously exhausted gas out the exhaust ports.

44 Claims, 59 Drawing Figures

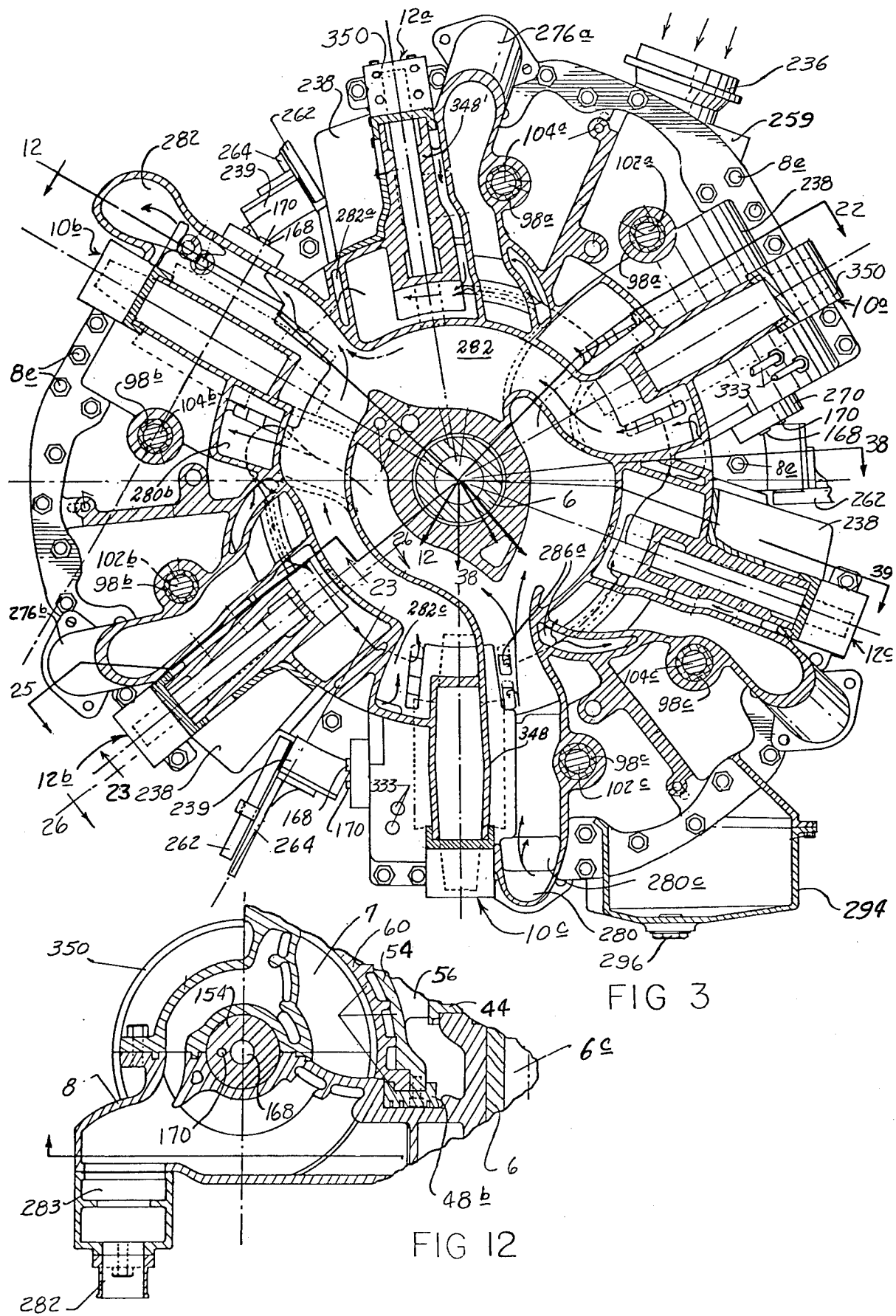

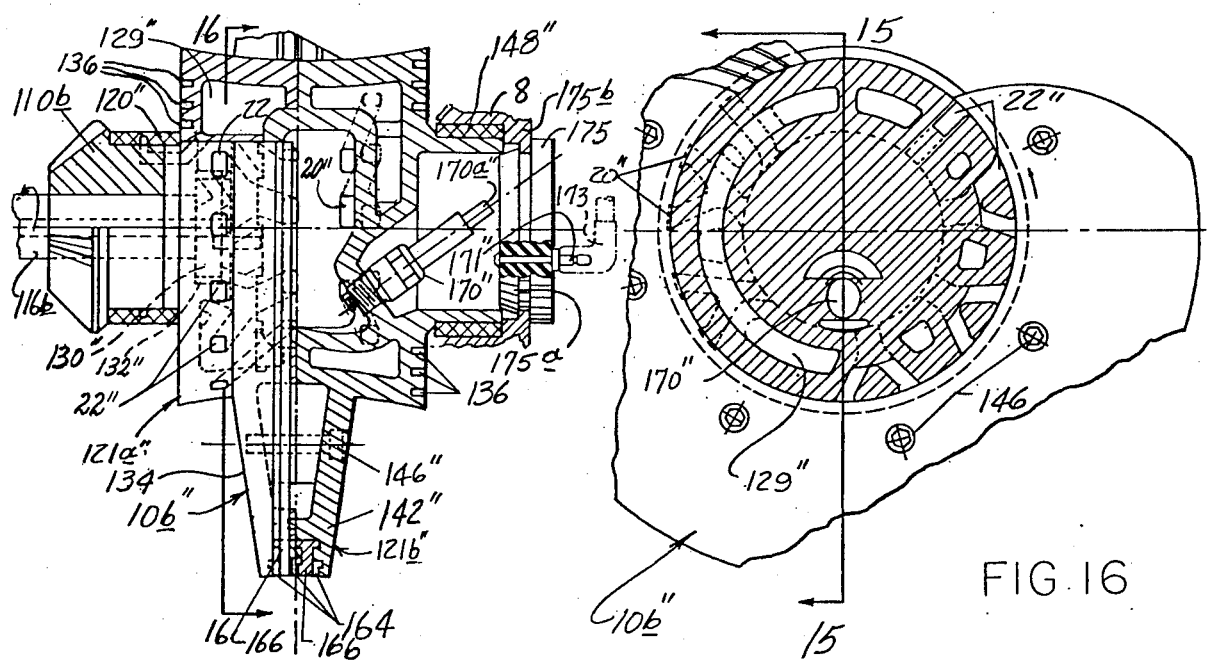
FIG. 15
FIG. 16
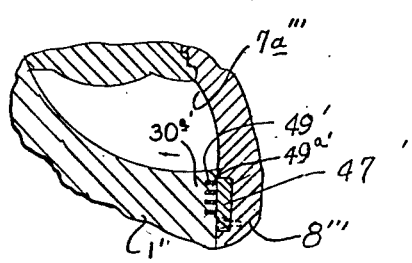
FIG 45
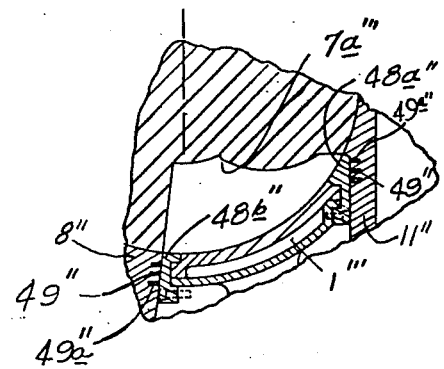
FIG 46
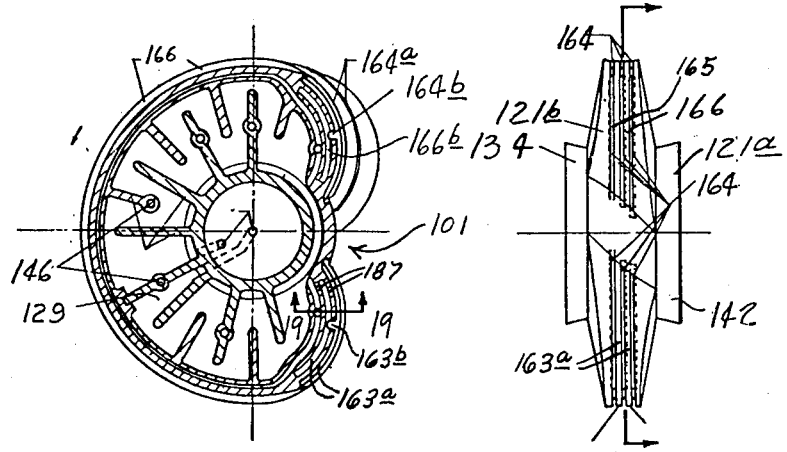
FIG 18
FIG 17
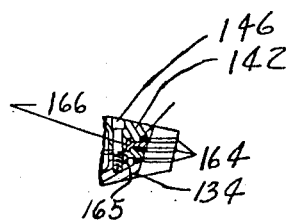
FIG 19

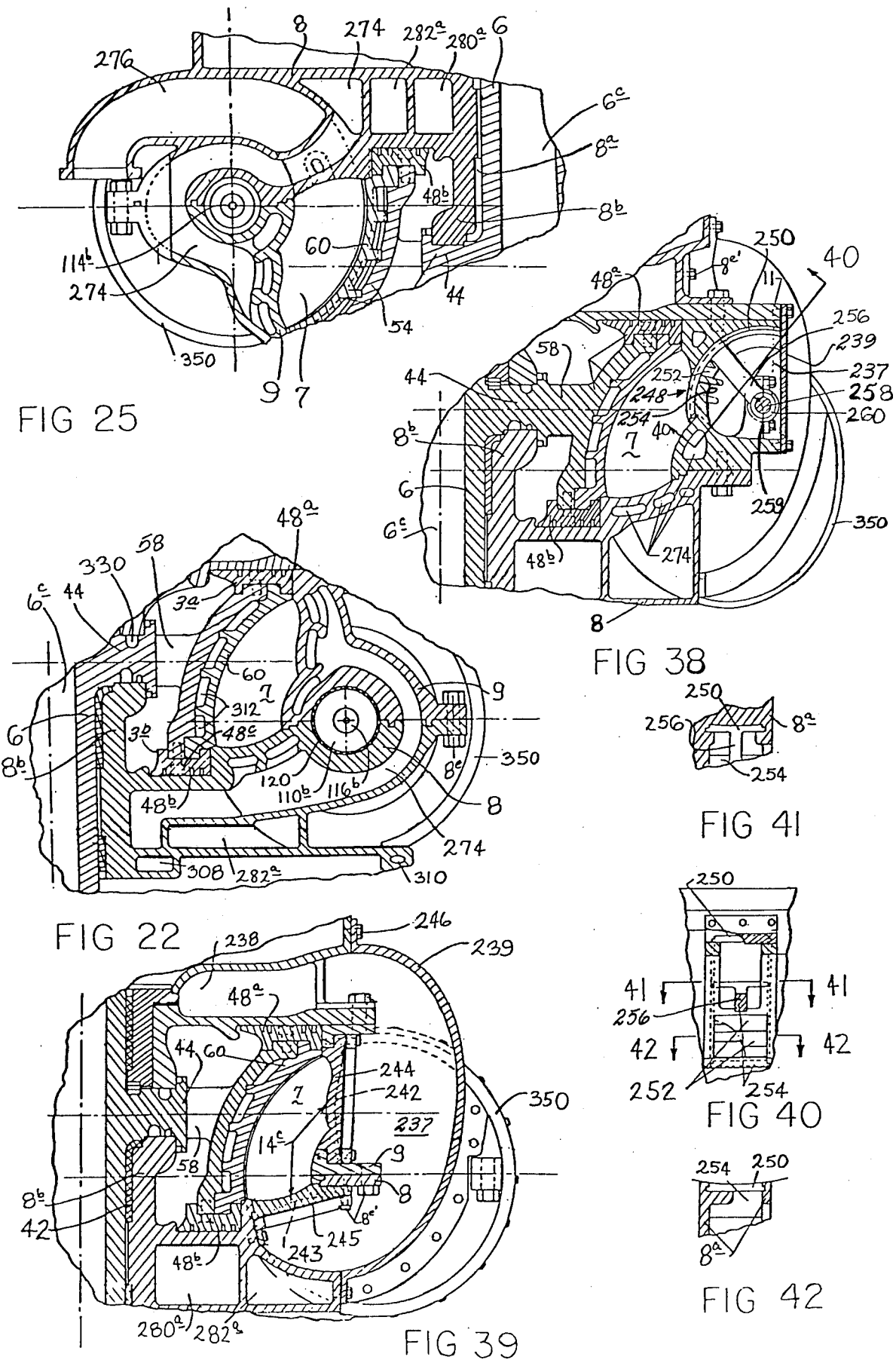

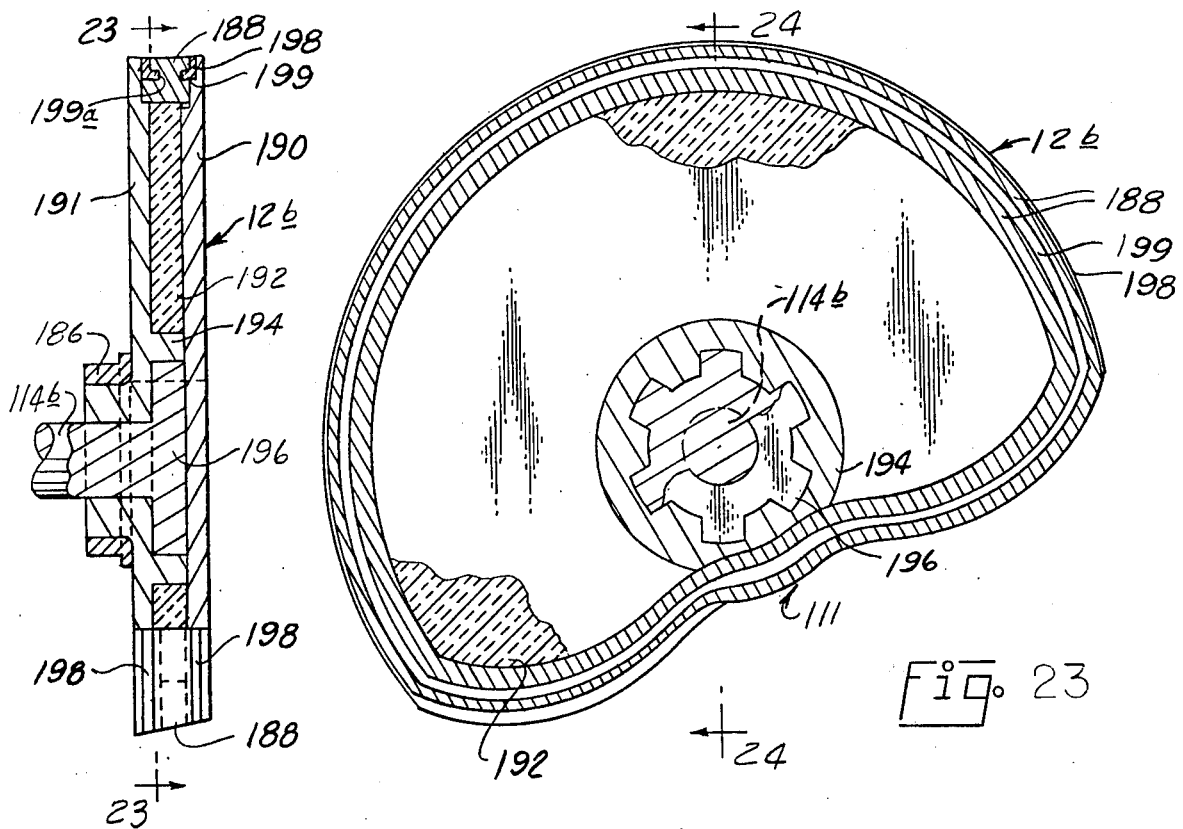
Fig. 23
Fig. 24
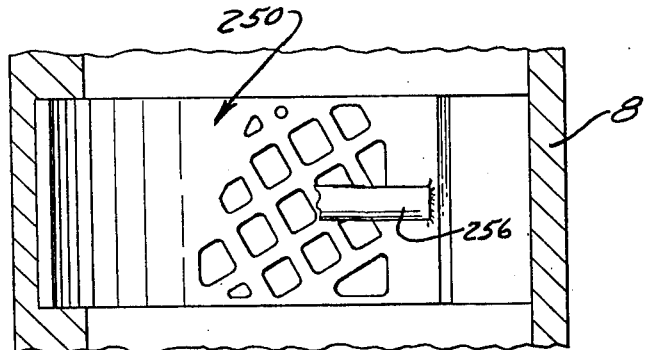
Fig. 44
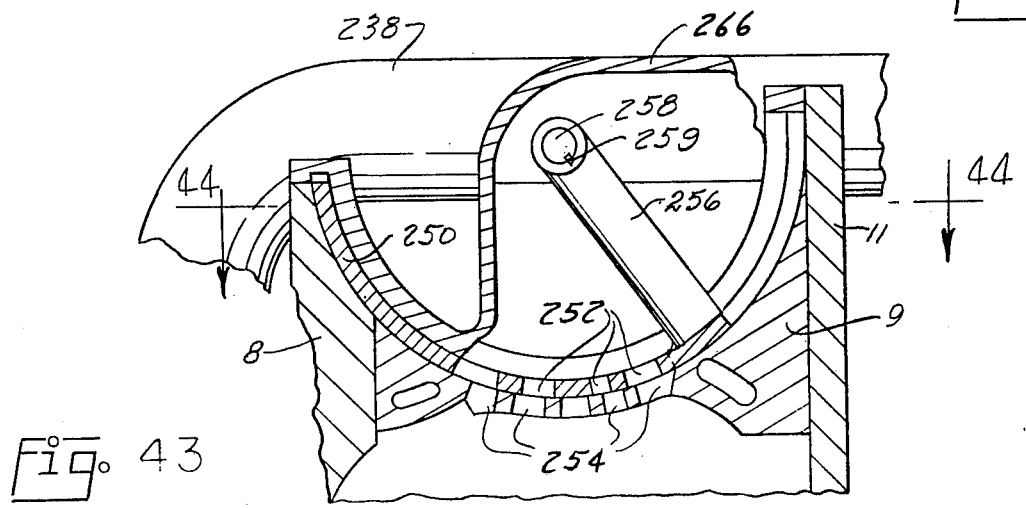
Fig. 43

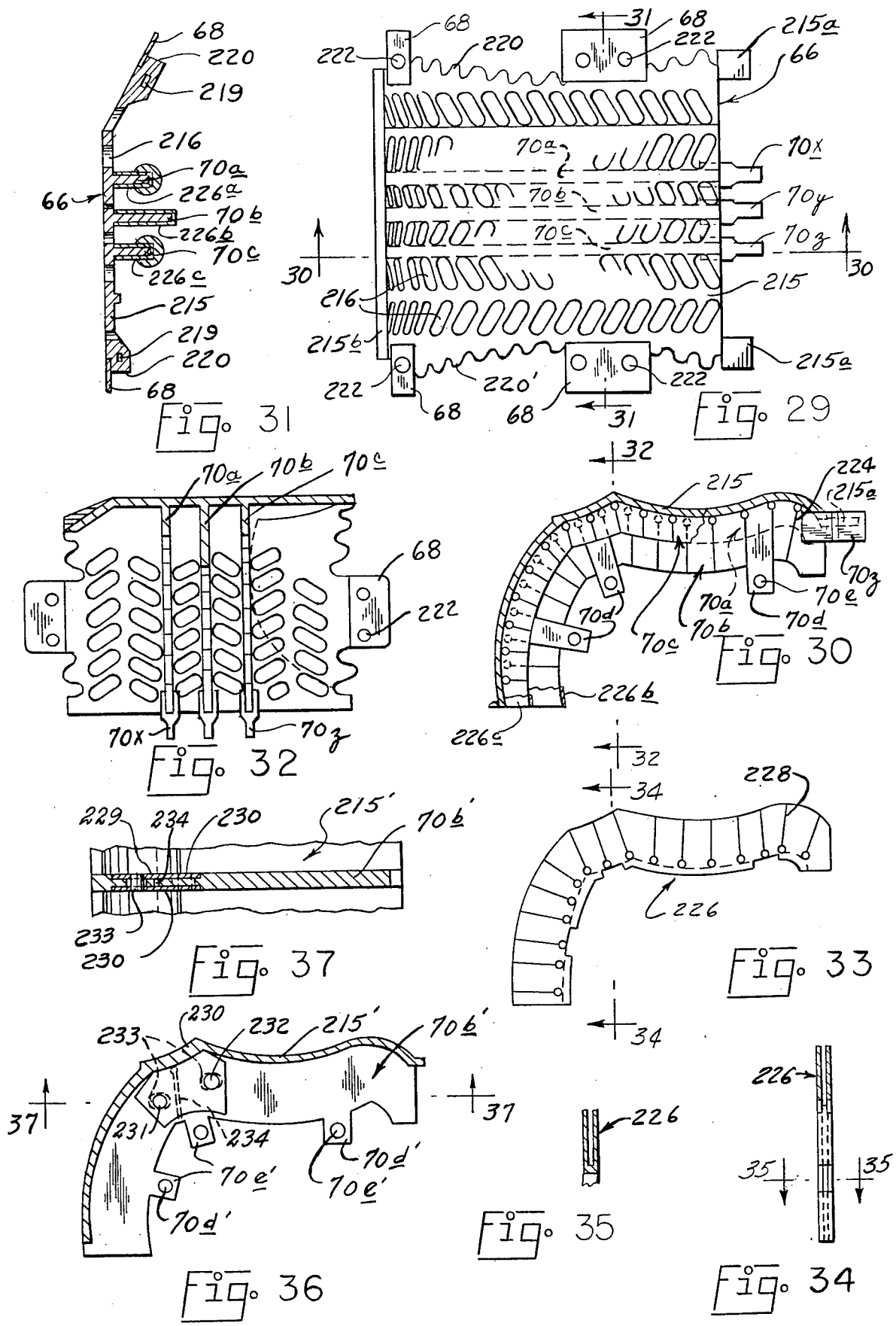

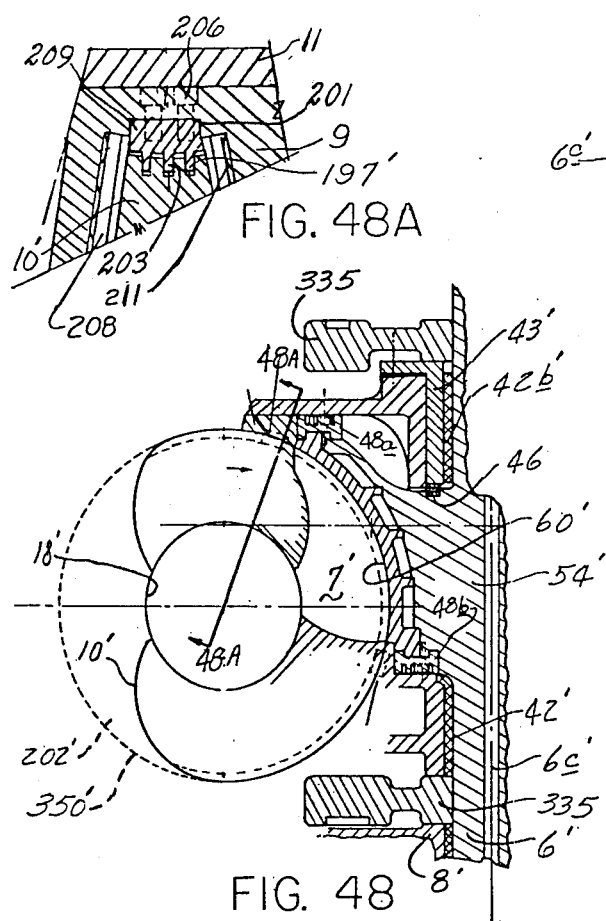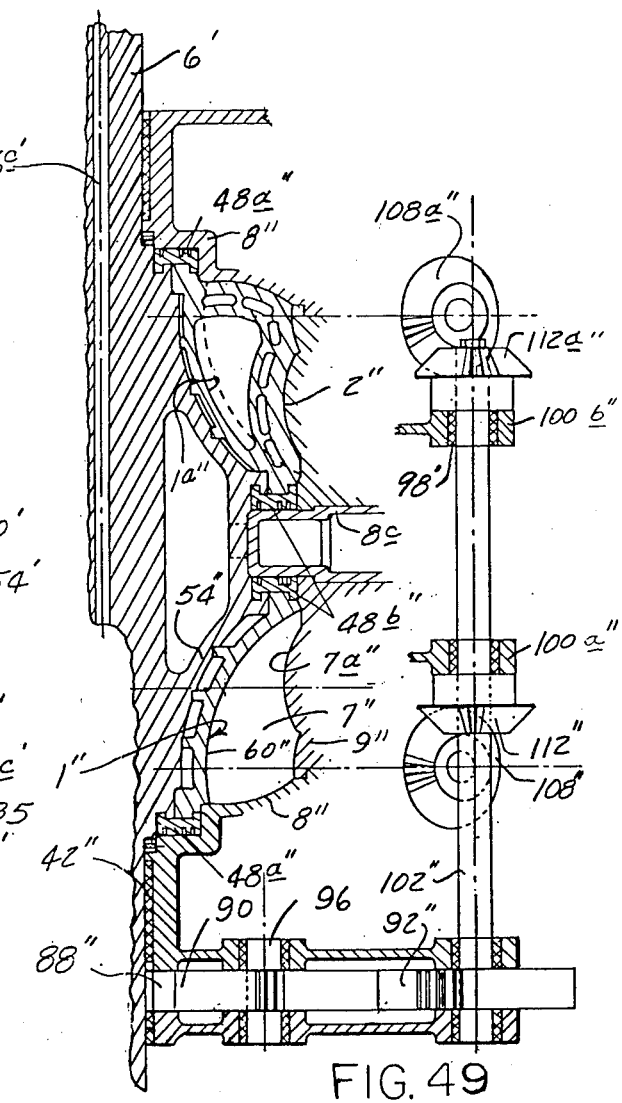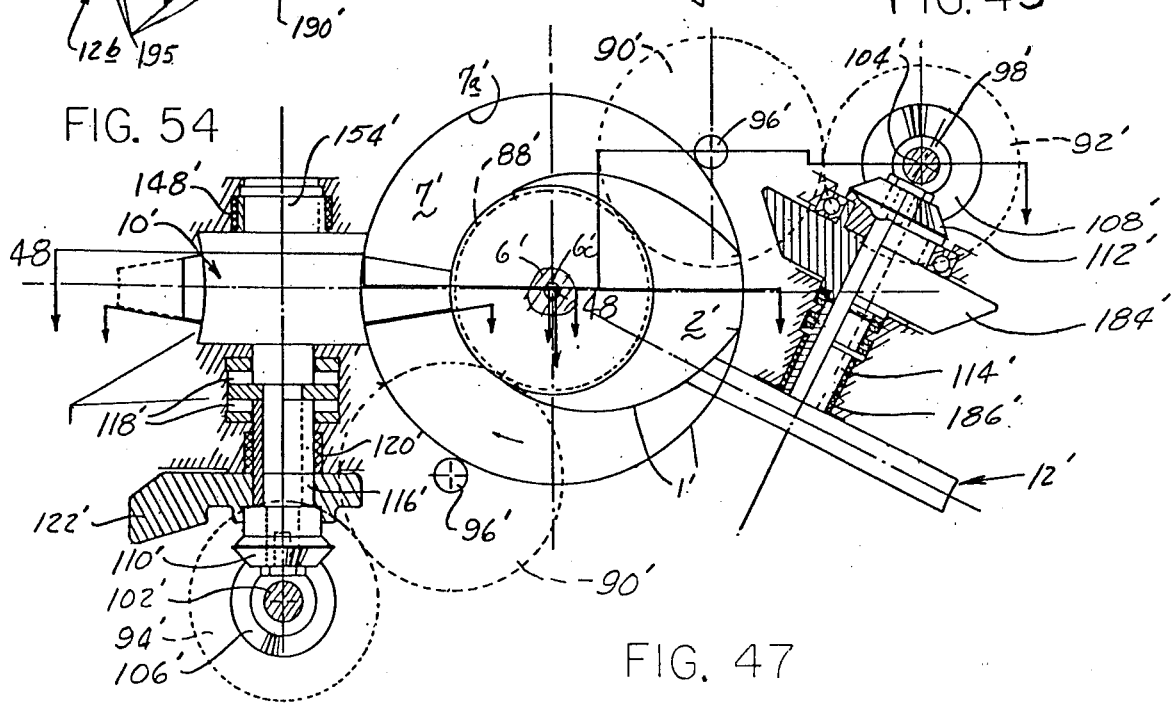

ROTARY ENGINE

BACKGROUND OF THE INVENTION

The working volume of a reciprocating piston internal combustion engine is basically a cylindrically shaped space in the engine block swept by the reciprocating piston. The same basic volume is used for the four cycle functions of intake, compression, expansion and exhaust, except as reduced by valve timing. The expansion stroke is usually so reduced and often by a substantial amount because of other considerations. The gas volume ratio of expansion to compression of these engines is often close to or less than unity. The available rotary engine also has a substantially unity ratio between expansion and compression gas volumes. An increase in expansion to compression volume ratio increases the fuel-air cycle efficiency of an engine, a substantial part of which can be translated into increased engine output. Also, with the higher expansion ratio there is more time for completion of the combustion process which results in cooler and otherwise less objectionable exhaust gas discharge to the atmosphere. For an engine with 16–1 compression ratio an increase of the expansion ratio from 16–1 to 35–1 will increase the fuel-air cycle efficiency from about 50 percent to above 60 percent. This is a fuel-air cycle efficiency increase of 20 percent or more.

In a reciprocating engine the considerable power used in reversing the inertia forces of reciprocating parts as they change directions is diverted from useful power output. Pistons and connecting rods of a two cycle engine reverse twice, and the more popular four cycle engine reverses four times per power impulse. In addition to the inertia forces per se, these forces introduce additional friction and vibration which divert additional power from the engine's useful output.

The compression ratio of both reciprocating and rotary piston engines is normally fixed and can only be changed by shop modification. For successful engine operation these engines are usually limited to a relatively narrow grade range of one type of fuel.

Easy cold weather starting is frequently used as the basis for the compression ratio of diesel engines and is a ratio usually higher than optimum for normal after start operating conditions.

Reciprocating engines have piston blow-by and crankcase pumping problems which require added controls to reduce contaminants released to the environment.

Heretofore, rotary piston engines by necessity have used a single line seal for the piston tip. This seal has been beset by wear and leakage problems. Also this engine is uneconomical in fuel consumption.

Many of the above disadvantages in reciprocating piston internal combustion engines also apply to reciprocating piston compressors, vacuum and pressure pumps and externally powered engines or motors.

My rotary piston machine overcomes the above outlined disadvantages.

SUMMARY

I have devised a rotary engine utilizing a circular rotor having a truncated by hyperboloid shape with one rim of lesser diameter than the other rim and the wall of said rotor having a concave radius equal to the outer radius of the rotating valves. The rotor has one or more spaced pistons extending from the rotor body which extend against the general circular torus wall formed in the inner housing. Slipper seals on the tip of each piston are actuated against the cylinder walls.

One or more divider valves form end closures for the gas cycle working sections and divide the intake valve from the exhaust port. The divider valve seals against the rotor and pistons and rotates about an axis tangent to the torus walls having a notch for a piston to pass therethrough.

One or more rotating compression-expansion valves are arranged in spaced relationship with the divider valves to divide the cycle working section into two working areas: an intake-compression section and an expansion-exhaust section. The compression-expansion valves rotate about an axis tangent to the torus wall and have an outer radius equal to the concave radius of the rotor body such that the generally circular-shaped valve is in sealing engagement against the rotor body and pistons. The compression-expansion valve has a notch formed therein such that as the piston extending from said rotor body passes the valve the piston will simultaneously pass through said notch.

The piston passes the divider valve and draws a vacuum on the intake valve, thereby drawing air in from an air intake manifold into the space between the divider valve and the compression-expansion valve. The air on the next piston pass is compressed into the compression ports communicating between the torus and the combustion chamber formed in the hub of the compression-expansion valve. After the air is compressed therein the piston passes the compression-expansion valve, the valve rotating simultaneously to seal the compression port, the gas is ignited and expansion ports on the opposite side of compression-expansion valve open, communicating with the expansion-exhaust space of the torus. The gases expand into the expansion-exhaust space and against the trailing face of the piston thus creating a force against said surface and a torque about the shaft to which the rotor is secured to rotate the shaft. As the piston is rotated because of the gases expanding thereagainst, the forward face of the piston forces exhaust gas from the previous expansion cycle against a divider valve which is in sealing relationship with the rotor and therefore forces gases to pass out through exhaust ports located adjacent the divider valve.

The primary object of the invention is to provide a rotary engine having separately defined compression and expansion spaces such that the engine can be built with any of a wide range of ratios between gas compression and expansion volumes. This includes a basic compression volume less than the expansion volume thus allowing more complete combustion of the gases and therefore a more efficient engine.

Another object of the invention is to provide an engine in which moving components rotate thus eliminating power losses which are caused by the reversing of the inertia forces of reciprocating parts.

Another object of the invention is to provide an effective multiple seal line piston seal system compatible with rotary pistons and valves, and which permits the seal means to pass potential obstructions without interference therewith.

A still further object of the invention is to produce a rotary engine that has high torque and a high horsepower rating at low rpm's to reduce the amount of wear in the engine.

A further object of the invention is to provide a relatively compact engine with both performance and fuel economy superior to comparable horsepower engines now in use.

A further object of the invention is to produce a rotary engine in which the expansion ratio is high compared to the compression ratio and therefore air pollution is reduced to a minimum due to more complete combustion, thereby reducing the percentage of objectionable atmospheric pollutants discharged from the engine.

A further object of the invention is to provide a rotary engine with a means to adjust the compression ratio to levels below the basic ratio while the engine is in operation.

A further object of the invention is to provide an engine which will operate efficiently on more than one grade and type of fuel without shop adjustment or modification.

A still further object of the invention is to provide a rotary engine powerful enough to drive any type of engine propelled transport means or other machine yet which is relatively compact so that the engine compartment or room may be reduced in size, making is particularly applicable for use in compact cars as well as for other automotive vehicles, boats, aircraft, locomotives, power generators, small utility hand tools, etc.

A further object of the invention is to provide an engine in which the shaft can optionally be produced with a hollow passage therethrough on the center line thereof. When this passage through the shaft is provided the engine may power a transmission the output of which is doubled back through the engine crankshaft to drive a mechanism on the opposite end of the engine.

DESCRIPTION OF THE DRAWINGS

Drawings of a preferred embodiment of the invention are annexed hereto so that the invention may be better and more fully understood, in which:

FIG. 3 is a cross-sectional view taken along line 3—3 of FIG. 2;

FIG. 12 is a fragmentary cross-sectional view taken along line 12—12 of FIG. 3;

FIG. 15 is a fragmentary cross-sectional view similar to FIG. 10 illustrating second modified form of the compression-expansion valve;

FIG. 16 is a fragmentary cross-sectional view taken along line 16—16 of FIG. 15;

FIG. 17 is a side elevational view of the compression-expansion valve illustrated in FIG. 10;

FIG. 18 is a cross-sectional view taken along line 18—18 of FIG. 17;

FIG. 19 is a cross-sectional view taken along line 19—19 of FIG. 18;

FIG. 22 is a cross-sectional view taken along line 22—22 of FIG. 3;

FIG. 23 is a cross-sectional view taken along line 23—23 of FIG. 3 illustrating details of construction of a divider valve;

FIG. 24 is a cross-sectional view taken along line 24—24 of FIG. 23;

FIG. 25 is a cross-sectional view taken along line 25—25 of FIG. 3;

FIG. 29 is a plan view of a slipper seal assembly, illustrated disconnected from the surface of the piston;

FIG. 30 is a cross-sectional view taken along line 30—30 of FIG. 29;

FIG. 31 is a cross-sectional view taken along line 31—31 of FIG. 29;

FIG. 32 is a cross-sectional view taken along line 32—32 of FIG. 30;

FIG. 33 is an elevational view of a seal bar envelope disconnected from the slipper seal assembly;

FIG. 34 is a cross-sectional view taken along line 34—34 of FIG. 33;

FIG. 35 is a cross-sectional view taken along line 35—35 of FIG. 34;

FIG. 36 is a cross-sectional view similar to FIG. 30 of modified form of the slipper seal;

FIG. 37 is a cross-sectional view taken along line 37—37 of FIG. 36;

FIG. 38 is a cross-sectional view of the combustion ratio reduction valve taken along line 38—38 of FIG. 3;

FIG. 39 is a cross-sectional view taken along line 39—39 of FIG. 3;

FIG. 40 is a cross-sectional view of a sliding gate taken along line 40—40 of FIG. 38;

FIG. 41 is a cross-sectional view taken along line 41—41 of FIG. 40;

FIG. 42 is a cross-sectional view taken along line 42—42 of FIG. 40;

FIG. 43 is a cross-sectional view of the compression ratio reduction valve similar to that of FIG. 38;

FIG. 44 is a cross-sectional view taken along line 44—44 of FIG. 43;

FIG. 45 is a cross-sectional view of a modified form of the rotor seals;

FIG. 46 is a diagrammatic view of a second modified form of the rotor seals;

FIG. 47 is a diagrammatic view of a modified form of the engine embodying a single rotor having a single piston thereon;

FIG. 48 is a cross-sectional view taken along line 48—48 of FIG. 47;

FIG. 48A is a cross-sectional view taken along line 48A—48A of FIG. 48;

FIG. 49 is a diagrammatic view of a second modified form of the engine embodying a two rotor system configuration;

FIG. 54 is a cross-section of a second modified form of the divider valve;

Numeral references are employed to designate like parts throughout the various figures of the drawings.

DESCRIPTION OF A PREFERRED EMBODIMENT

Referring to FIGS. 1, 50–53 and 55 of the drawings, numeral 1 generally designates a rotor having pistons 2 and 4 equally spaced about the rotor 1 and extending outwardly therefrom. The rotor 1 is rigidly secured to shaft 6 and as viewed in FIG. 1 rotates in a counter-clockwise direction.

Figure 1:
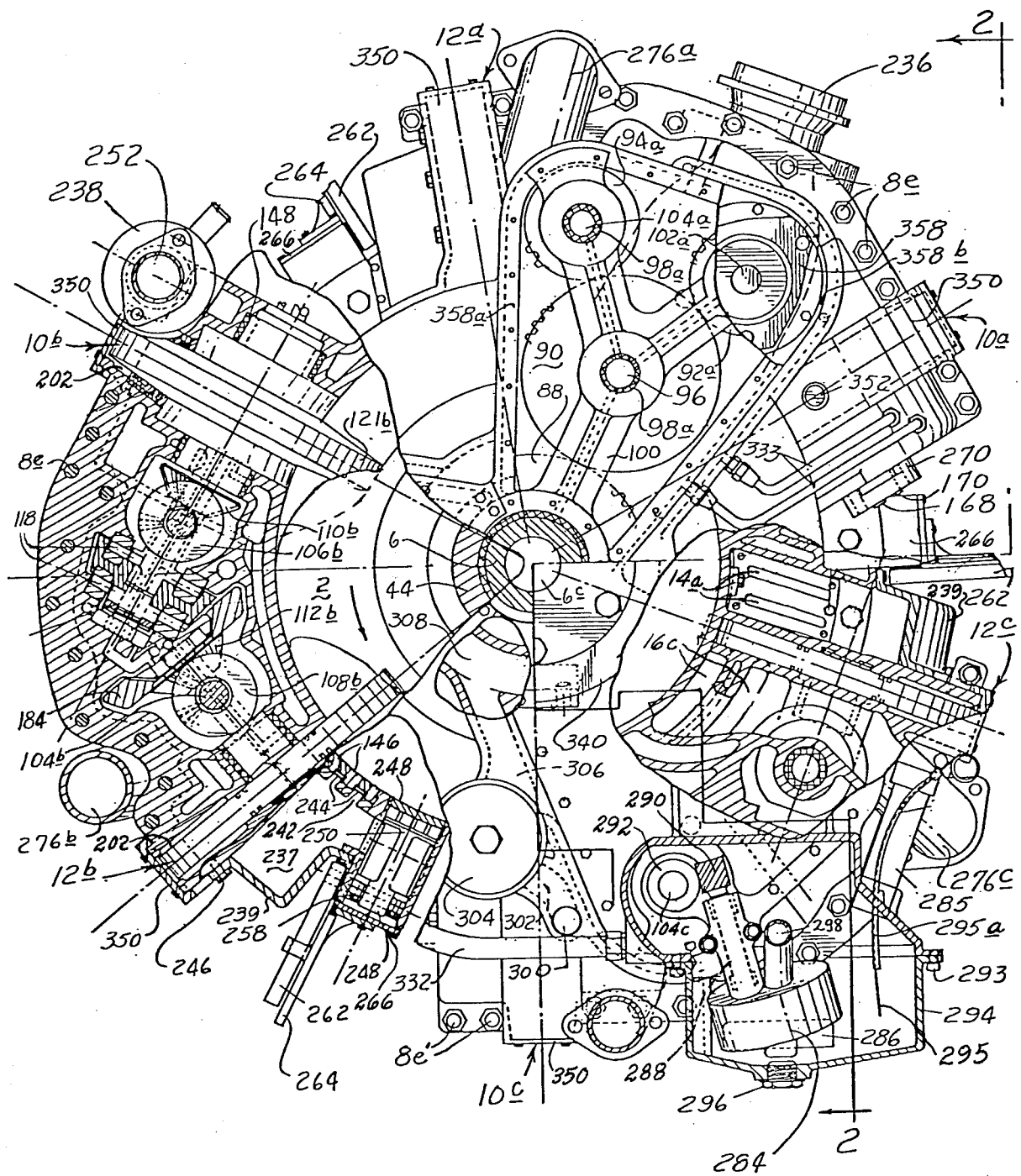
FIG. 1 is an end view of the engine, parts being broken away so that the details of construction may be better and more fully understood.
Figure 2:
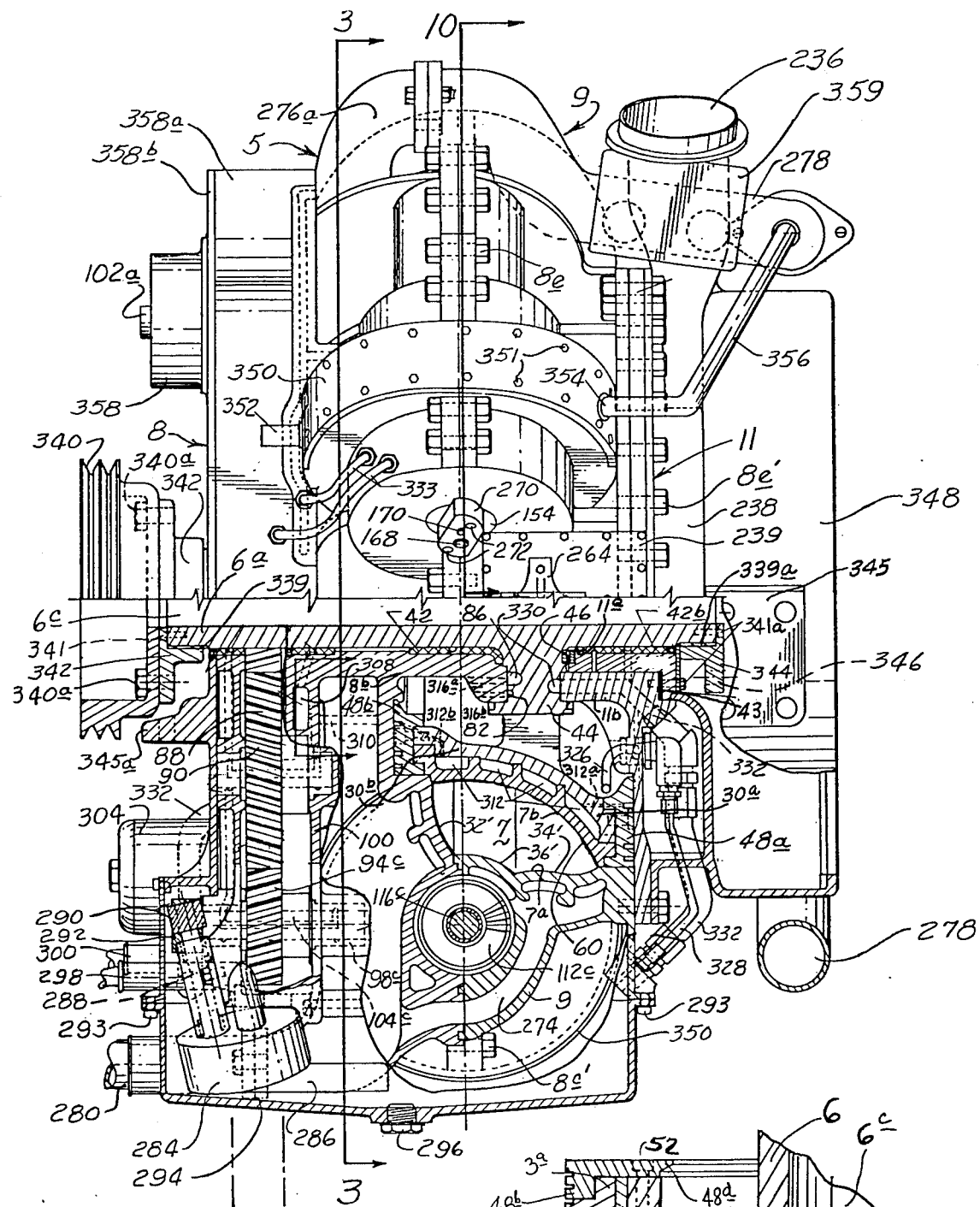
FIG. 2 is a partially sectionalized side elevational view taken along line 2—2 of FIG. 1.

The rotor 1 and hollow shaft 6 are rotatably disposed in a non-rotating housing 5, best illustrated in FIGS. 1 and 2. The housing 5 comprises block segments 8, 9 and 11 secured together by suitable connectors such as bolts 8e, screws 8e' and dowels 8e''. Connections between block segments 8, 9, and 11 are sealed by gaskets or other suitable seal means.

Block segment 8 comprises a metal casting having a central axially extending passage 8a formed in a hub 8b. A flange 8c extends outwardly from hub 8b and has a gas working space wall section 32' extending about the periphery thereof.

Block segment 9 comprises a hollow casting having a gas working space wall sections 34' and 36' formed therein.

Block segments 8 and 9 have outwardly extending flanges secured together by bolts 8e.

Block segment 11 comprises an end plate having a central passage 11a extending through a hub 11b.

As will be hereinafter more fully explained, rotor 1 has retainer seals 48a and 48b secured to rims 30a and 30b thereof which are urged into sealing engagement with surfaces on block segments 11 and 8, respectively.

In the embodiment of the invention illustrated in FIG. 2, the rotor 1 and shaft 6 are of integral construction and connected by a hub 44. The shaft 6 extends through passages 8a and 11a in block segments 8 and 11 and hub 44 is captured between ends of hubs 8b and 11b.

The gas working space wall sections 32', 34' and 36' extend circumferentially about the central axis of shaft 6 and form an outer torus wall 7a about a hollow circular gas working space 7.

As will be hereinafter more fully explained the outer surface of rotor 1 forms an inner torus wall 7b of the hollow circular gas working space 7.

Figure 52:
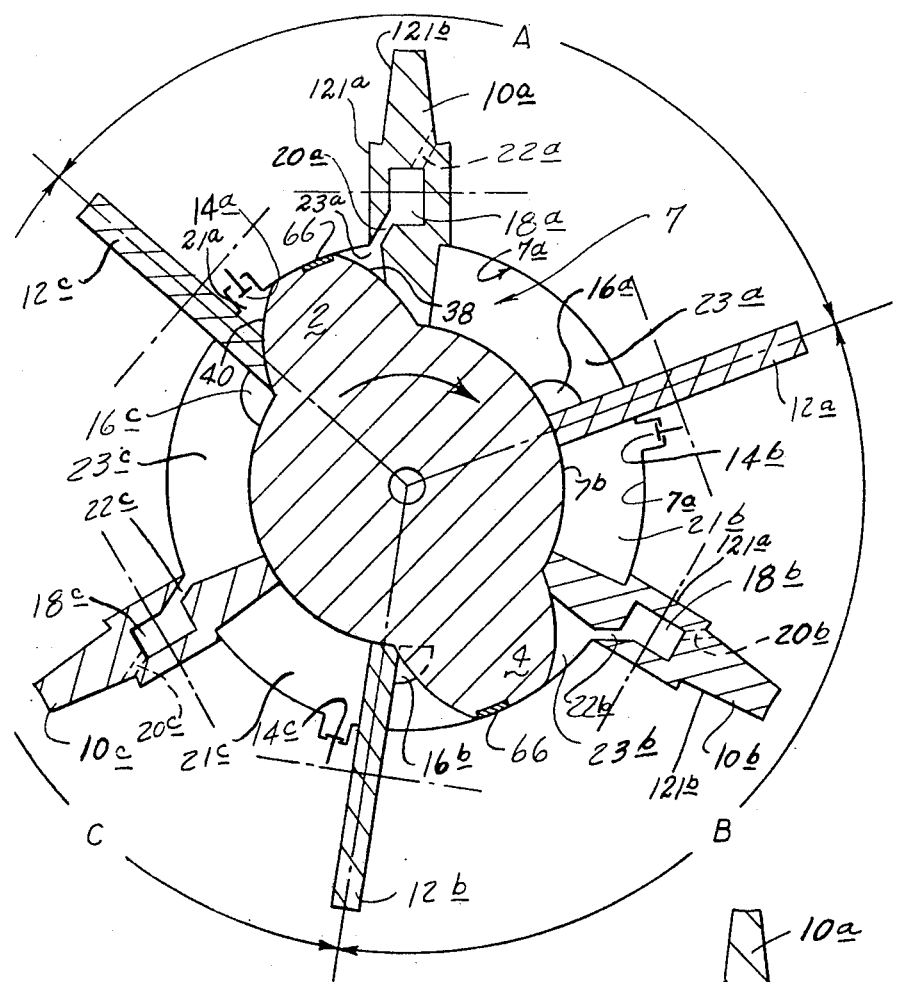
FIG. 52 is a diagrammatic view of the intake compression phase of piston 2.

As best illustrated in FIG. 52, the center of the block forms the gas working space of the engine and is substantially shaped like a tubular torus 7. Torus wall 7a forms the outer portion of the torus 7 while the rotor 1 forms the inner walls 7b. The torus 7 has an irregular cross-section as illustrated in FIG. 2 which conforms to the outer surfaces of pistons 2 and 4 which sub-divide the volume of torus 7.

Torus wall 7a has sections 32', 34', and 36' which conform to the configuration of tips or outer ends of piston 2 and 4.

As best illustrated in FIG. 52, divider valves 12a, 12b, and 12c define the separate gas cycle working sections A, B, and C within the torus 7.

The gas intake and compression functions of the engine are performed in gas working spaces 21a, 21b, and 21c and the expansion exhaust functions of the engine are performed in gas working spaces 23a, 23b, and 23c which spaces are separated by the C-E (compression-expansion) valves 10a, 10b, and 10c. The working functions of each section A, B, and C are similar in nature.

Intake valve means 14a, 14b, and 14c are located adjacent to divider valves 12a, 12b and 12c in working spaces 21a, 21b, and 21c to regulate the intake of gases. Exhaust ports 16a, 16b, and 16c are on the opposite side from intake sides of the divider valves 12a, 12b, and 12c in gas working spaces 23a, 23b, and 23c to allow expanded gases to be pushed from the working sections of the engine.

The engine starts as piston 2 of rotor 1 rotates past divider valve 12c, drawing a vacuum on gas working space 21a and intake valve 14a, opening same, thus drawing gas through intake valve 14a into gas working space 21a. Simultaneously, the gas in front of piston 2 of rotor 1 previously drawn in by piston 4, is being compressed into combustion chamber 18a, through compression port 20a in C-E valve 10a. As piston 2 rotates past C-E valve 10a (FIG. 53), the forward face 38 of piston 2 completes the compression of gas into combustion chamber 18a. C-E valve 10a simultaneously rotates with the rotor 1 to close compression port 20a. Ignition is initiated in combustion chamber 18a by ignition means which will be more fully explained hereinafter. As the burning gas pressure builds up, piston 2 passes C-E valve 10a and trailing face 40 starts to clear valve 10a. Expansion ports 22a communicate with gas working space 23a upon rotation of C-E valve 10a until gases from the combustion chamber 18a expand through expansion ports 22a into gas working space 23a and against trailing face 40 of piston 2. The gases push against the piston 2 of rotor 1, thus pushing the rotor in a clockwise direction as viewed in FIG. 53 and turning shaft 6. As piston 2 moves in a clockwise direction past the C-E valve 10a, exhaust gases from the last expansion cycle against piston 4 in area 23a are pushed through exhaust port 16a by the forward face 38 of piston 2. The cycle is repeated in each of the three working sections A, B, and C.

Figure 4:
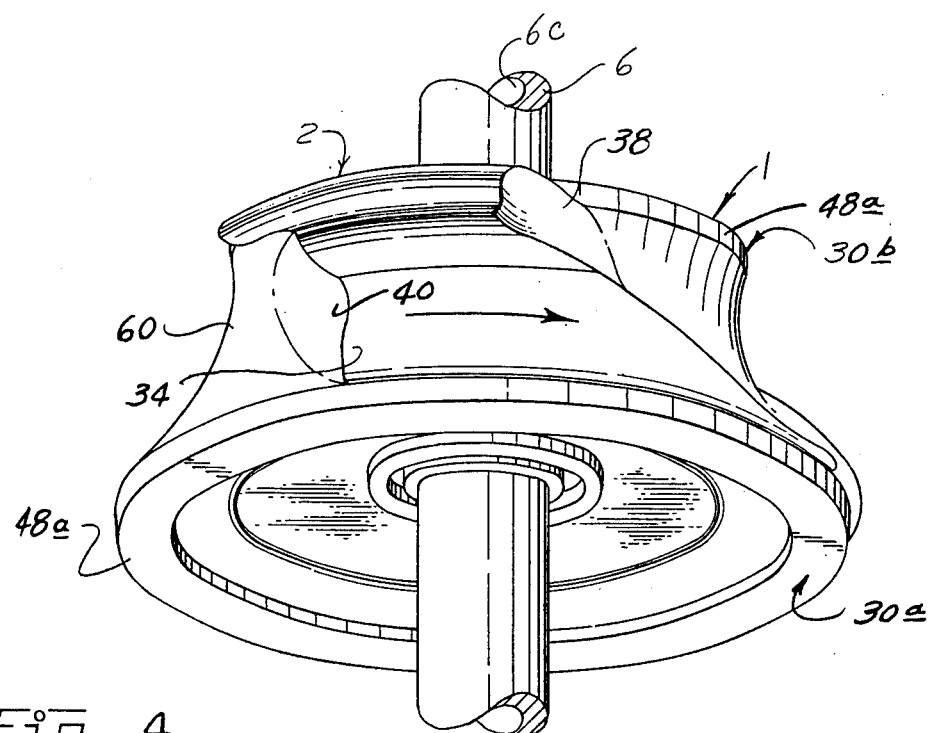
FIG. 4 is a diagrammatic perspective view of the rotor with two pistons taken from the large diameter side thereof.
Figure 5:
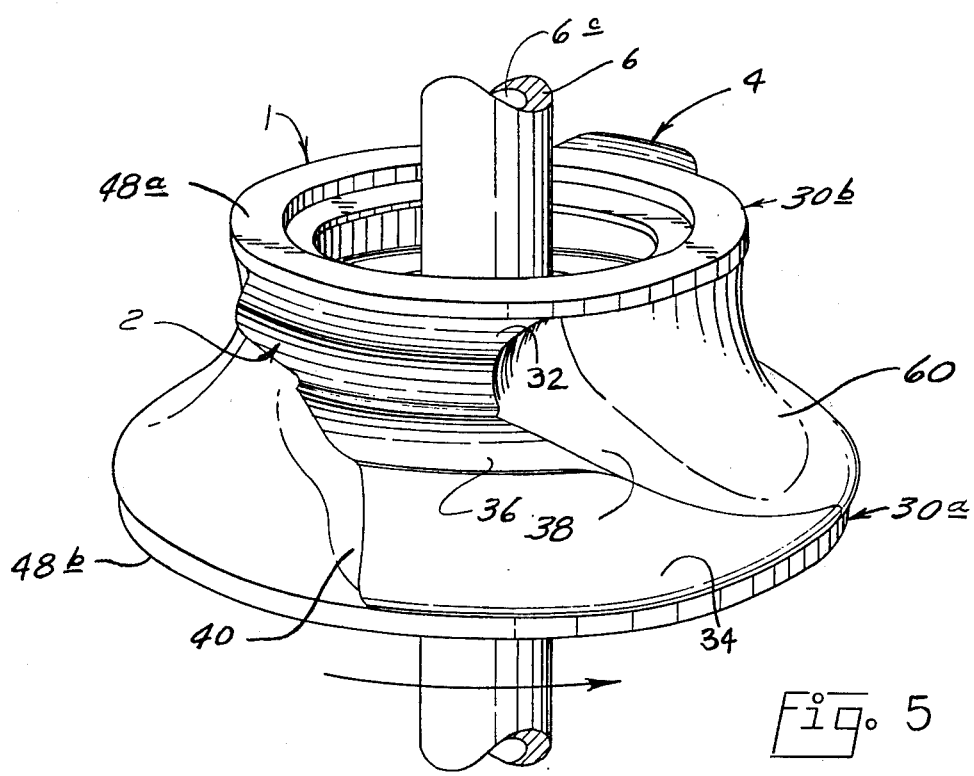
FIG. 5 is a diagrammatic perspective view of the rotor taken from the small diameter side thereof.

The rotor 1, as more clearly illustrated in FIGS. 4 and 5, comprises a truncated hyperboloid body 30 having spaced pistons 2 and 4 thereon which extend outwardly therefrom. Two circular rims 30a and 30b form the ends of body 30 with circular rim 30b preferably of less diameter than circular rim 30a. The rotor surface between rims 30a and 30b is concaved and has an inner radius the same as the radii of valves 10 and 12.

The pistons 2 and 4 have a convex surface 32 adjacent rim 30b of body 30 and a concave surface adjacent rim 30a of body 30 with a valve hub groove 36 formed between the inter-section of the two surfaces 32 and 34. The pistons 2 and 4 are in sealing relationship with torus wall 7a as will be more fully explained hereinafter.

Figure 6:
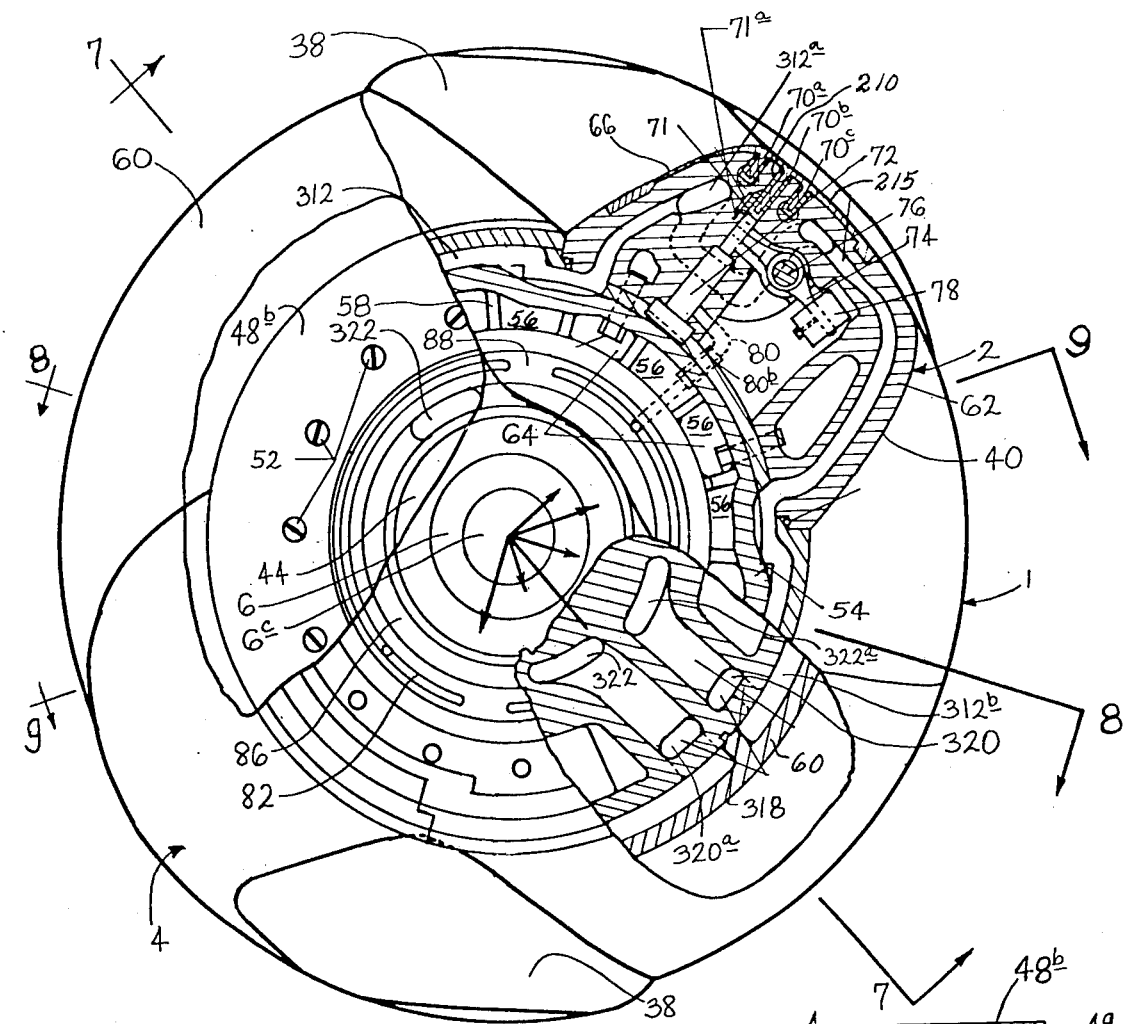
FIG. 6 is a plan view of the rotor with parts being broken away to more clearly illustrate details of construction.
Figure 7:
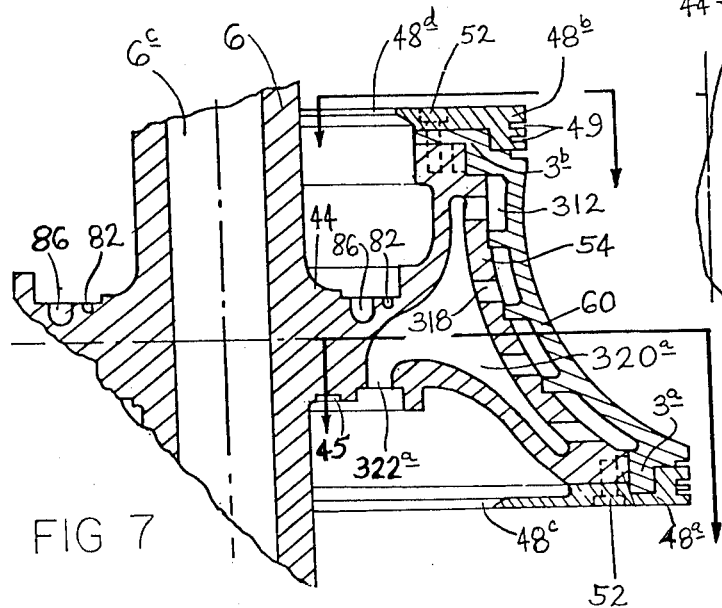
FIG. 7 is a fragmentary cross-sectional view taken along line 7—7 of FIG. 6.
Figure 8:
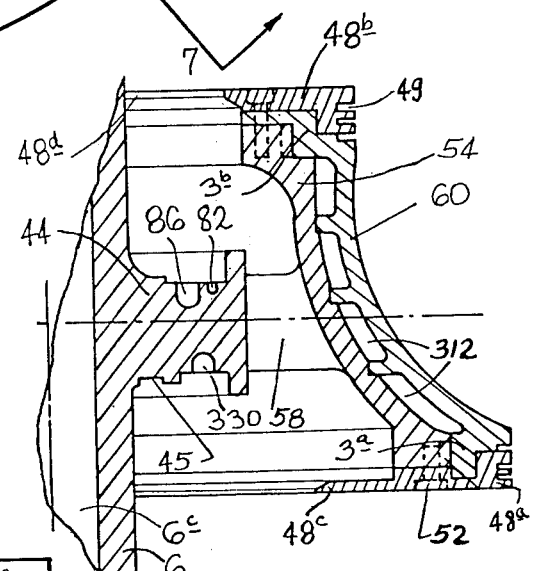
FIG. 8 is a fragmentary cross-sectional view taken along line 8—8 of FIG. 6.

The main body 30 of rotor 1, FIGS. 6, 7 and 8, is comprised of a hub 44 and outer casting 54 which extends outwardly from shaft 6. The outer casting 54 has spaces 56 positioned between webs 58 formed in the casting 54 to reduce the weight and aid in cooling of the rotor 1. Outer casting 54 is covered by a replaceable liner 60 formed of heat resistive metal to protect the casting 54 from the hot gases.

Replaceable retainer seals 48a and 48b are rigidly secured to rims 30a and 30b by means such as attachment means 52 to seal against the block segment 11 and 8 and to secure pistons 2 and 4 to body 30 of rotor 1. The radially inwardly extending lips 48c and 48d of retainer seals 48a and 48b reduce the movement of free oil outward into the torus 7. The retainer seals 48a and 48b FIGS. 2, 22, 38 and 39, have a channel shaped cross-section with grooves 49 formed in the surface thereof to bear against the torus wall 7a. Sealing rings 49a (FIG. 2) are slideably disposed in grooves 49 and are spring urged outwardly against the torus wall 7a.

Each piston 2 and 4 has a forward face 38 which compresses fresh, unburned gas into the combustion chambers 18a–18c and expells spent exhaust gases, and a trailing face 40 which draws fresh air in from the intake ports 14a–14c and against which burning gases from combustion chambers 18a–18c expand.

The pistons 2 and 4 are preferably formed from metal of a type to resist hot gases and are rigidly secured to the casting 54 by attachment means 64, FIG. 6, and retainer seals 48a and 48b. Retainer seals 48a and 48b, FIG. 9, have grooves 48c formed over pistons 2 and 4 such that lugs 3a and 3b which are formed adjacent rims 30a and 30b are interlocked therein to rigidly secure the pistons 2 and 4 to body 30 of rotor 1. The pistons 2 and 4 have seal assembly 65 (FIG. 6) which includes a slipper seal 66 on the outer tips thereof to prevent escape of gases between pistons 2 and 4 and cylinder wall 7a.

It should be readily apparent that an alternate construction of rotor 1 is possible by eliminating liner 60 (FIG. 6) and casting the rotor 1 from a hardened metal thus requiring shorter retaining seals 48a and 48b which would only be required adjacent pistons 2 and 4 to secure them to the main body. Further, the shaft, rotor and pistons can be cast as one piece exclusive of seals and other appurtenances as another alternate.

The shaft 6, as illustrated in FIG. 2 of the drawings, is journalled through block segments 8, 9, and 11 and is supported by main bearings 42. As the engine is assembled, the the rotor 1 is first fitted into block 11 with the larger diameter rim 30b adjacent the block 11. Block segments 8 and 9 are then positioned so that segment 11 is against hub 44 of rotor 1. Block segment 11 and sleeve 43 support end 6b of shaft 6. Block segments 9 and 11 are rigidly secured together by bolts 8e. Thrust bearing 46 is secured in bearing groove 45 formed in hub 44 between flanged sleeve 43 and the hub 44 to absorb end thrust from rotor 1 and support same. End thrust from the rotor 1 occurs during compression and low pressure during the gas expansion function.

Alternate retainer seal construction has grooves 49' (FIG. 45) formed in rims 30a' and 30b' of the rotor 1' with a replaceable insert 47 secured to torus wall 7a''' in Block segments 8 and 11. Rings 49a' are spring urged outwardly from grooves 49' against insert 47.

FIG. 46 illustrates another embodiment of the retainer seals having retainer seals 48a'' and 48b'' with smooth surfaces in a double rotor engine of the type illustrated in FIG. 49. Grooves 49'' are formed in torus wall 7a'''' with seal rings 49a'' slideably disposed thereon and spring urged against retainer seals 48a'' and 48b''. Yet another alternate seal construction uses a multiplicity of concentric tongue and groove rings with the tongues alternatively on the retainer seal 48 and on mating surfaces of the block segments 8 and 11 to provide a labyrinth seal effect (not shown).

It should be readily apparent that other variations may be employed and that the number of grooves and seal rings may be varied depending on the requirements of the engine.

The slipper seal 66 system for pistons 2 and 4 is shown in FIGS. 6 and 29 through 35. Slipper seal 66 is applicable to all pistons but reference is to piston 2 as an example. The function of slipper seal 66 is to serve as a means for piston seal bars 70a, 70b, and 70c to rotate past valves 10 and 12 and to bridge the openings 7e in torus wall 7a at the junction with the valve casings 8f of block segments 8 and 9 without interference or catching between parts.

The slipper 66 is in one piece made up of seal line bars 70a, 70b, and 70c and plate 215. A multiplicity of seal line bars such as 70a, 70b and 70c shown in FIGS. 6 and 31 perform the sealing function between the torus wall 7a and piston 2. Seal bars 70a, 70b, and 70c are located in the tip of piston 2, preferably with the leading bar 70a located close to the leading edge of the piston tip as best illustrated in FIG. 6. In this forward location, bars 70a, 70b, and 70c pass the expansion ports 22 before the ports are open and before expanding gas has developed high expansion temperatures. Seal bars 70a, 70b, and 70c are located near the center, in a circumferential direction, of flexible metal plate or grille 215.

Plate 215 has a pattern of holes and slots 216 and may have auxiliary underside stiffeners (not shown) on both sides of each seal bar. Plate 215 terminates at each end in a set of fingers 220 and 220' as shown in FIG. 29, which mate with a similar set of fingers in the surface of piston 2. The preferred arrangement of the line of finger ends is in a curved or Vee configuration. The other than a straight line end allows the finger junctions to pass the locations of possible intereference one or two at a time instead of all at once. The forward ends of fingers 220 are slightly rounded in sled runner fashion to further reduce chances of intereference.

In the preferred arrangement fingered ends 220 of the slipper seal 66 are thickened as shown in FIG. 31 to provide space for elongated hole 219. A pin 221 preferably has essentially flat sides of a diameter of the hole 219 in a radial direction but of lesser width than hole 219 in a circumferential direction. Pins 221 are inserted in the holes 219 and mating holes in piston 2 to secure the end of the slipper 66 in place. The slipper ends 220 are thus held flush with the adjoining surface on piston 2 in a radial direction but are free for limited movement in a circumferential direction. This movement and the limited flexibility to plate 215 allows seal bars 70a, 70b, and 70c to have radial movement sufficient to perform their sealing function. Because of the contour of the piston, one or a multiplicity of pins 221 may be used at each end of slipper 66.

Additional attachment means, such as clips 68 having holes 222 are mounted in recesses in the surface of piston 2 and secured by a means such as screws through holes 222 may be employed, if it is deemed expedient to do so, to secure plate 215 to piston 2. The edge of the clip over hangs a recess in the edge of plate 215 to hold the fingered end of plate 215 flush with the adjoining surface on piston 2. Since clip 68 is not fastened to plate 215, the plate 215 can move in a circumferential direction.

The slipper seal 66 outer plate or grille 215 fits into recesses in the piston 2 surface to form substantially a continuation of the piston 2 surface. To reduce friction the area of plate 215 is reduced by holes and slots 216 to the extent feasible without impairing its primary function. The openings 216 in plate 215 allows pressure equalization between the outer and inner surfaces of plate 215. The slots and holes 216 in plate 215 loosely fit mostly over piston studs 218 which extend outward from the surface of the piston 2 recess for plate 215. Studs 218 reduce the dead space volume in the slipper seal means 66 thereby increasing engine efficiency, assist the sealing process by taking advantage of the labyrinth sealing effect, reduce volume for accumulation of combustion residuals such as carbon and provide a means in conjunction with the slight movement of the slipper 66 to keep potentially clogging debris from collecting in openings 216.

The circumferential ends 215a of the slipper seal 66 generally terminates back of the retainer seals 48a and 48b. Short sections of independent spring urged seal bars 70x, 70y, and 70z (FIG. 30) are used to extend the continuity of the seal across the top of retainer seals 48a and 48b and thus complete the piston seal system.

These bars 70x, 70y, and 70z are urged into sealing position by backing springs 210 which are recessed with the seal bars in the rim of retainer seals 48a and 48b and the edge of the slipper seal 66. These short seal bars 70x, 70y, and 70z have a U-shaped end next to the slipper which fits snugly around the ends of seal bars 70a, 70b, and 70c to continue to seal lines. As indicated in FIGS. 6 and 29 through 35, the slipper seal 66 is of irregular configuration to conform to the shape of the piston. In addition to the flexible sections in plate 215, a means is used to permit flexibility of the seal bars 70a, 70b, and 70c such as slots 224 and an envelop 226 with slots 228. The slots 228 in envelop 226 are staggered from the location of slots 224 in bars 70a, 70b, and 70c so that when envelop 226 is assembled over bars 70a, 70b, and 70c a continuous seal surface is provided. A means such as rivets 225 or indents (not shown) is used to secure envelope 226 on seal bar 70.

At least one of the seal bars 70a, 70b, and 70c has one or more projections 70d with a hole 70e for connecting the slipper seal 66 pressure control system which will be hereinafter described in more detail. Projections 70d pass through a hole in the bottom of the U of envelope 226 and into a mating hole in the piston 2 body.

One seal bar, such as bar 70b, serves as a positioning or anchor means in a circumferential direction as shown in FIG. 6. Anchor seal bar 70b with its envelop 226 has a movable but snug fit in its piston 2 slot. To further restrict circumferential movement and better seal the bar 70b an alternate wedge type side seal 217 is urged into a sealing position radially by a means such as coil springs 217a and circumferentially by a wiggle spring 217b. This wedge seal system can also be used with other seal bars 70. Each seal bar 70 with its envelope is urged in sealing relationship with the torus wall 7a by a backing spring 210 located under the end of the seal bar envelop. These springs exert sufficient seal pressure for engine starting but less seal pressure than the total pressure required at operating speed. The remaining required seal pressure is exerted by hydraulic means hereinafter described. Piston slots for the seal bars on either side of the anchor seal bar 70b, such as seal bars 70a and 70c are shaped to allow for a difference in expansion and contraction of piston 2 and the plates 215 between these bars and bar 70b. These slots are slightly wider at the open end than otherwise required for the seal bar 70. This wider top section is carried as a taper to near the closed end of the slot. In the preferred arrangement the bottom ends of seal bars 70a and 70c and their envelop 226 have a contour that will accommodate a cylindrical seal section with a slot in the side of the cylinder to fit snugly over the bar and envelop.

As the slipper seal plate 215 expands or contracts at a different ratio from the piston 2, the seal bar bends slightly to tilt to the side of the slot while the cylindrical seal rotates slightly while in a sealing position with the piston body and the seal bar 70 with its envelop. Seal bars 70 with envelop 226 must have a minimum clearance to permit radial movement sufficient to perform their sealing function.

An alternate arrangement (not shown) is the same as above except that the cylindrical seals are omitted from the bottom of seal bars 70 and envelop 226. The tapered section of the sides of slots for bars 70a and 70c terminate above the bottom of the slot leaving a slot bottom of substantially rectangular cross section and matching the shape of the end of the seal bar envelop to thus form a seal between piston 2 and the ends of seal bars 70a and 70c and their envelop 226 as shown in FIG. 6. Seal bars 70 are indicated as substantially rectangular in cross section but may be made with a varying cross section with the end next to slipper seal plate 215, a mid point between the plate and the bar end, and the other bar end each having a different thickness from the other.

A modified form of the slipper seal 66' FIGS. 36 and 37 comprises plate 215' having seal bars 70' extending therefrom and extension 70d' for connection to the pressure control system. For flexibility the seal bars 70' are joined by a hinge 230 having plates 229 and hinge pins 231 and 232 which are moveable in an elongated slot 233 formed in seal bar 70'. It should be readily apparent that due to slot 234 formed adjacent hinge 230 between slots 233 that seal bar 70' is capable of movement in and out of the surface of the piston lobe and thus forming a seal as described heretofore.

Figure 26:
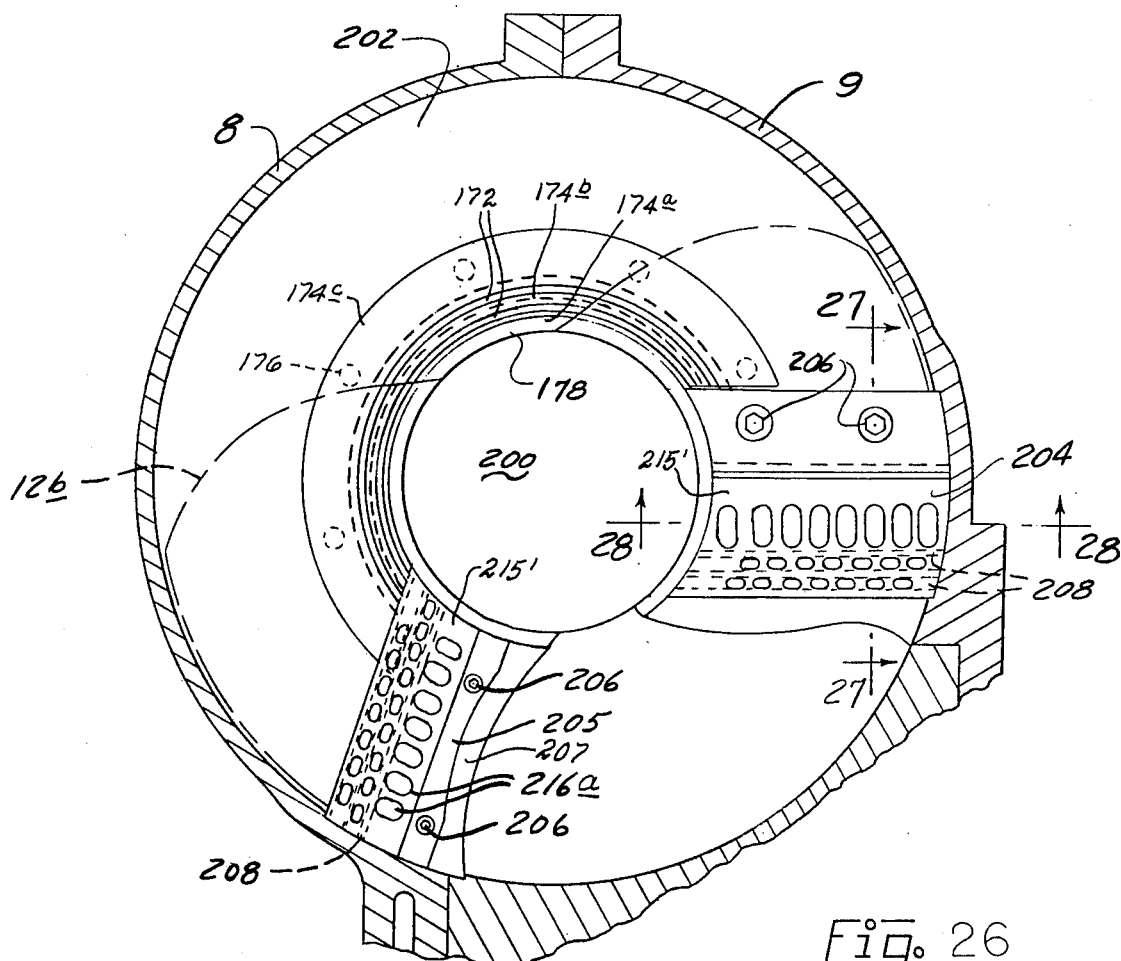
FIG. 26 is a cross-sectional view taken along line 26—26 of FIG. 3 illustrating seals attached to the block.
Figure 28:
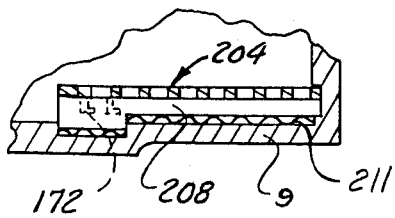
FIG. 28 is a cross-sectional view taken along line 28—28 of FIG. 26.
Figure 27:
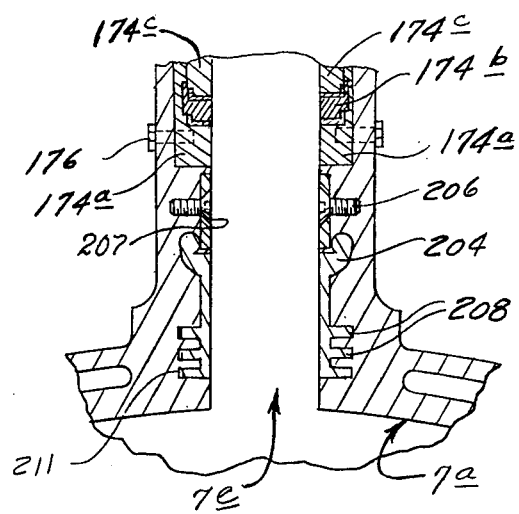
FIG. 27 is a cross-sectional view taken along line 27—27 of FIG. 26.
Figure 50:
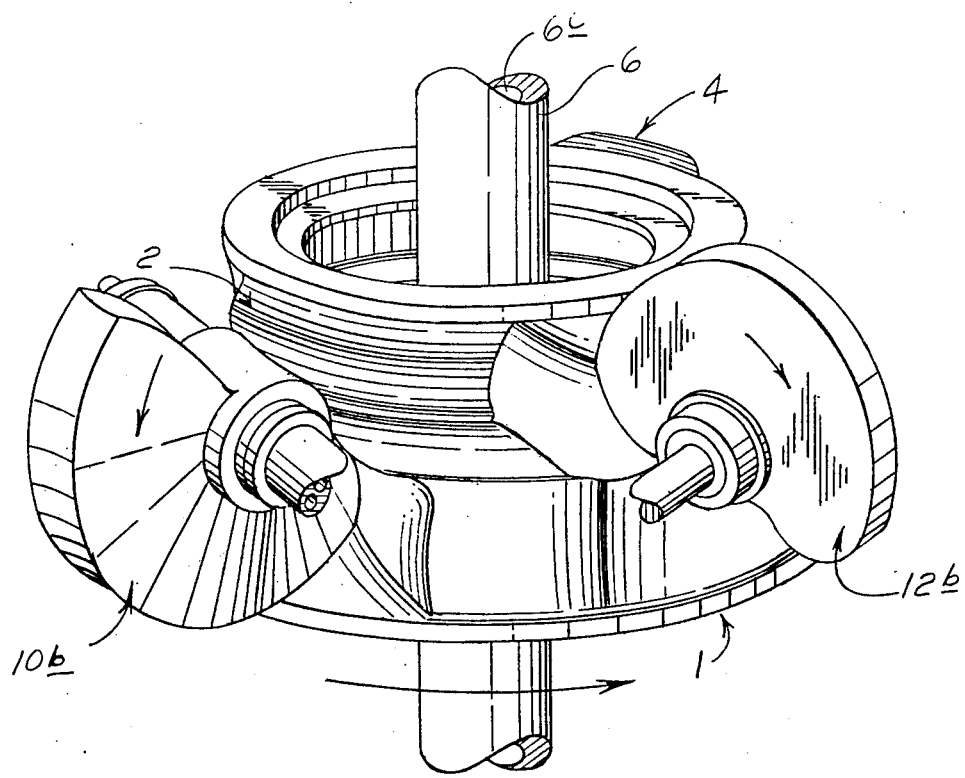
FIG. 50 is a diagrammatic perspective view of the rotor in association with pistons thereon and valves embodied in the preferred embodiment of the engine.
Figure 51:
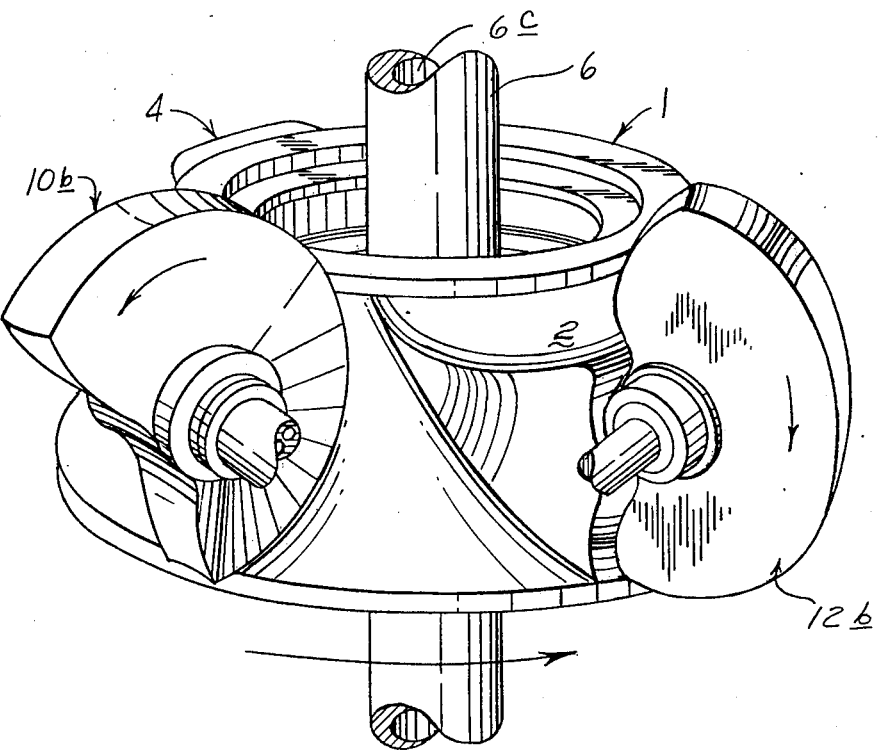
FIG. 51 is a diagrammatic perspective view of the rotor with pistons thereon in association with valves in a later position.

It should be readily apparent that slipper seals 204 and 205 of the rotary valve side seals, function in a manner similar to slipper seal means 66. Sealing means shown and described for slipper seal 66 are applicable to seals 204 and 205 shown on FIGS. 26, 27 and 28 as hereinafter further described.

The pressure on seal bars 70a, 70b, and 70c is influenced by three means including the wiggle springs 210, the hydraulic actuator 72 and the counterweight 78.

The hydraulic actuator means (FIG. 6) uses one or more hydraulic actuators 72 each consisting of a small hydraulic cylinder which upon being energized moves a piston (not shown) outwardly to apply pressure against the slipper seal 66 through one or more seal bars such as bar 70b. When the hydraulic actuator 72 is de-energized pressure from this source is removed from slipper seal 66. The primary function of the hydraulic actuator system is to provide means for regulating the pressure on the slipper seal 66 to provide optimum engine performance. Higher seal pressures can be used during start-up, at low engine rpm, and under some heavy loading conditions. Lighter seal pressure can be used with high engine rpm, especially when the load is relatively light.

The alternate optional use is to momentarily reduce slipper seal 66 pressure during the time the piston passes the valve casing opening. The hydraulic actuator 72 is connected to a passage 80 which communicates with continuous oil groove 86 and a non-continuous oil groove 82 both formed in hub 44 of the piston 1. Oil groove 82 is such that as the rotor 1 rotates oil pressure will be maintained in oil groove 82 from oil supply channels to be described hereinafter. However, the oil groove 82 is not continuous and when passage 80 is blocked by a space 84 in hub, the hydraulic actuator 72 ceases to receive pressure from this source. The non-continuous oil groove 82 is more clearly illustrated in FIG. 7 and is parallel to oil supply groove 86 which provides continuous oil pressure for lubrication, cooling and hydraulic pressure to the rotor 1. Control means (not shown) are located in the oil supply lines from each source oil grooves 80 and 82 to perform the control functions. An alternate oil supply means (not shown) for hydraulic actuators 72 and their control is by use of a separate oil piping and pump from the oil source.

The counterweight 78 is adjusted during design or when installed to counter-act centrifugal force pressure on seal bars 70a, 70b, and 70c. The counterweight 78 can be positioned to provide forces that are more, equal or less than the centrifugal force effect on the slipper seal 66 and seal bars 70a, 70b, and 70c. This adjustment in turn influences pressure to be supplied by backing springs 210 and the hydraulic actuator 72. The preferred setting is to offset slightly more than the slipper seal 66 centrifugal pressure. Thus at low engine speeds the seal pressure would be substantially uneffected by either the slipper or the counterweight but as engine speed increases the counterweight system would counteract all of the centrifugal force from the slipper seal 66 and part of the pressure on slipper seal 66 from spring 210 and hydraulic actuator 72.

As shown in FIG. 6 the pivot arm 74 is fitted with a bearing 76a an rotates about a fixed shaft 76. The counterweight 78 is fastened to one end of the lever arm 76 by a means such as threads on the lever arm and a set screw 78a. The opposite end of the pivot arm 74 is linked to seal bar 70b projection 70d by a means such as by the hole therein. Hydraulic actuator 72 is located to apply pressure on the end of the projector 70d and when actuated to thus urge the slipper seal 66 into a higher pressure sealing configuration.

Valve drive means comprises a timing gear 88 (FIG. 1) rigidly secured to end 6a of shaft 6 which drives idler gears 90a, 90b, and 90c which drive timing gears 92a, 92b, and 92c and 94a, and 94b, and 94c (FIG. 1). Idler gear 90a is supported by shaft 96 which is rotatably secured in bearings 98a, supported by frame member 100. Gears 92a and 94a are rigidly secured to shafts 102a and 104a which are rotatably supported by bearings 98a secured in frame member 100. It should be readily apparent that the three sets of gears in the preferred embodiment for driving the C-E and divider valves are substantially similar in their construction. Alternate drive means such as chains or belts or gear train arrangements may be used to drive the C-E and divider valves.

As best illustrated in FIG. 1, shafts 102b and 104b have mitered bevelled gears 106b and 108b rigidly attached thereto, which drive bevel gears 110b and 112b which are rigidly attached to shafts 114b and 116b. Shafts 116b and 114b are rigidly secured to C-E valve 10b and divider valve 12b, respectively, as will be more fully explained hereinafter.

The shaft sets 102a–102c and 104a (FIG. 1) may extend to the outside of a block segment 8 as through fitting 358 to drive accessories such as a fuel injection pump, power steering pump, or other accessories (not shown).

Figure 10:
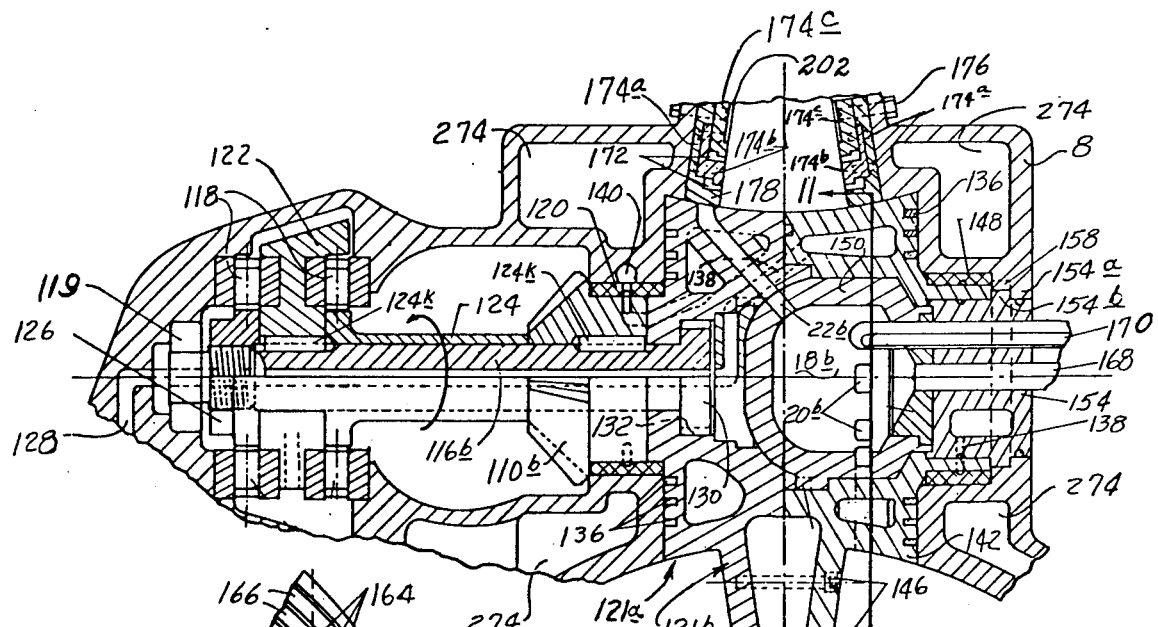
FIG. 10 is a cross-sectional view taken along line 10—10 of FIG. 2 illustrating details of construction of a compression-expansion valve.
Figure 11:
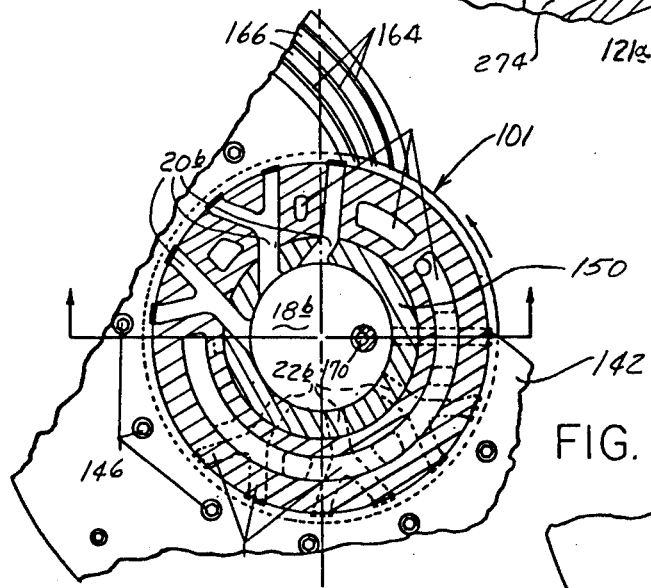
FIG. 11 is an enlarged cross-sectional view taken along line 11—11 of FIG. 10.
Figure 13:
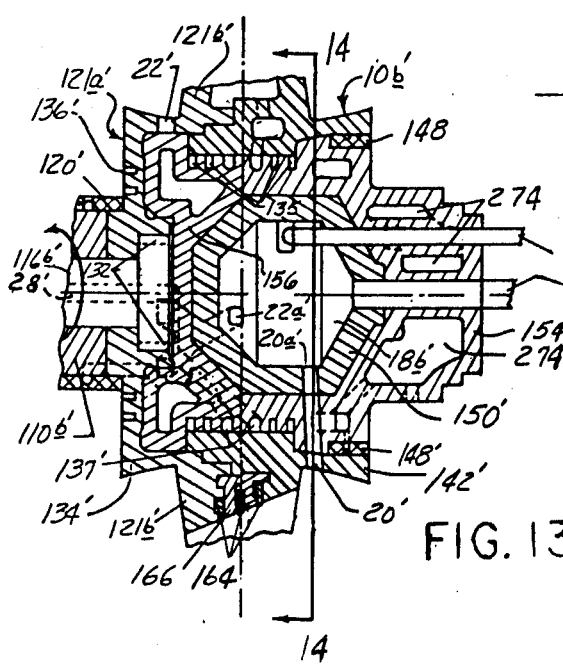
FIG. 13 is a fragmentary cross-sectional view similar to FIG. 10 of a modified form of the compression-expansion valve.
Figure 14:
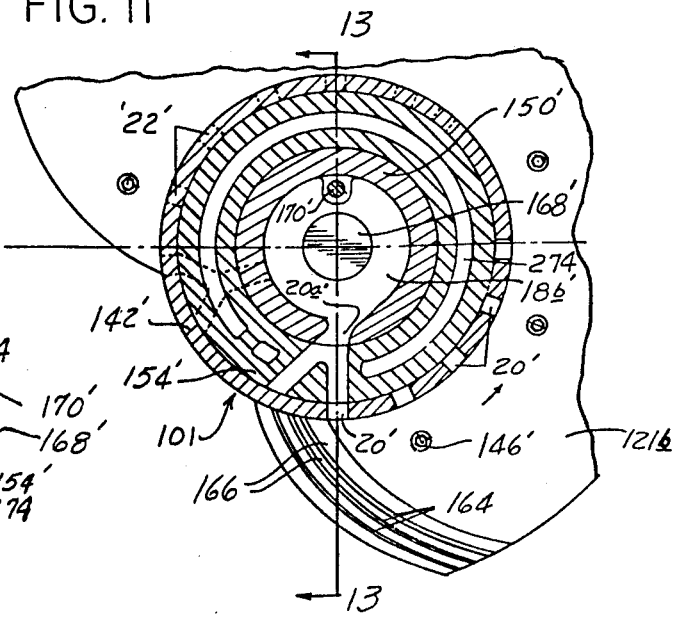
FIG. 14 is a cross-sectional view taken along line 14—14 of FIG. 13.
Figure 21:
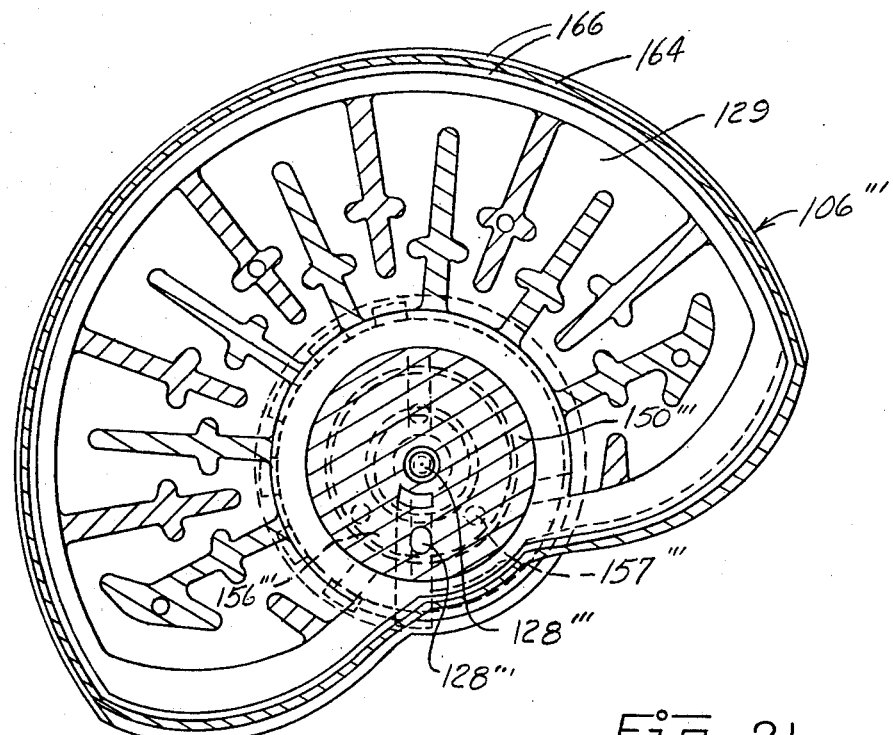
FIG. 21 is a cross-sectional view taken along line 21—21 of FIG. 20.
Figure 20:
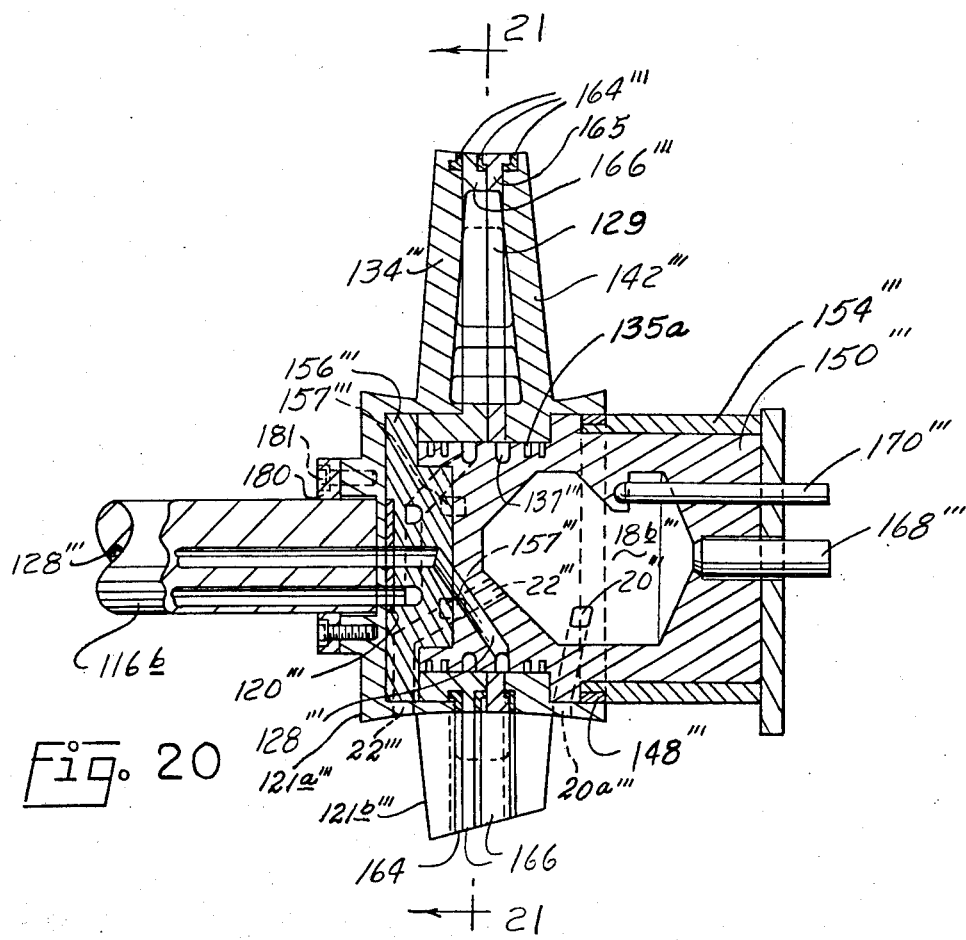
FIG. 20 is a fragmentary cross-sectional view similar to FIG. 10 illustrating a third modified form of a compression-expansion valve.

C-E valve 10b, as illustrated in FIG. 10 of the drawings, has a circular spooled shaped hub 121a in which the combustion chamber 18b is formed and a disc like body 121b extending radially outwardly from the hub 121a. C-E valves 10a–10c serve as a stop for gas being compressed and directly controls the flow of gases to and from the combustion chamber upon ignition thereof.

The C-E valves 10a–10c are of sufficient thickness to act as cantilever beams supported at the hub 121a and have sufficient rigidity to take the force of expanding gases from combustion without significant bending. Therefore, the disc body 121b is preferably thicker at the hub 121a than at the circumference of the valve. The perimeter of the C-E valves 10a, 10b, and 10c are of sufficient thickness to provide space for a perimeter sealing means hereinafter more fully described.

The C-E valve 10a–10c extend into torus 7 through valve openings 7e formed in the torus wall 7a and are rigidly secured to rotating shafts 116a, 116b, and 116c. The shafts 116a–116c are substantially tangent to the outer torus wall 7a and positioned such that valves 10a–10c seal against the liner 60 of body 30 of rotor 1. Valve 10a–10c have recessed areas or ramped notches 101 (FIG. 18) formed therein and synchronized upon rotation of the valve to allow pistons 2 and 4 to pass by the valves. The outer radii of C-E valves 10a–10c are equal to the inner radius of the metal liner 60 of rotor 1 and thus the valves 10a–10c seal against the body 30 of the rotor 1. As the rotor 1 rotates with shaft 6 valves 10a–10c are synchronized with the rotation of a rotor 1 by means of the valve drive means and simultaneously rotate with the rotor 1 to allow pistons 2 and 4 to pass through the valve notch 101 maintaining a continuous seal with the pistons and valves as the pistons 2 and 4 rotate past the valves 10a–10c.

(FIGS. 7 and 2) which communicates with passage 331 which communicates with oil return passage 332 connected to the oil pan 294.

A separate coolant circuit is provided for each piston 2 and 4 in rotor 1 and the circuit for piston 4 is substantially identical to that of piston 2. Each circuit is supplied with oil from passage 316a and circular groove 86. From cooling jacket passages 312, 312a, and 312b (FIG. 2), oil is forced through these passages to lubricate retainer seals 48a and 48b and slipper seal 66. A control system oil passage 312c connects to the hydraulic actuator 72. Oil groove 82 is connected to hydraulic actuator 72 by oil passage 80 and groove 82. The connection between passage 80 and grooves 82 is formed by sleeve 80b positioned through the junction of body 54 and the piston (FIG. 6).

The space between body 54 and block segments 8 and 9 is free from oil except for such leakage as passes hub 44, oil seal 81, or the seal between rotor 1, retainer seals 48a and 48b and block segments 8 and 11. To remove possible leakage oil from this space an impact type oil collection nozzle 326 is located near the low point in the space (FIG. 2). Nozzle 326 communicates with oil return conduit 328 to return the oil to oil pan 294 by gravity.

An alternate lubrication cooling arrangement (not shown) for rotor 1 and appurtenances has a rotor 1 and pistons with single wall perimeter surfaces of rotor 1 and pistons 2 and 4, without coolant oil passages. Cool oil is introduced into rotor 1 as heretofore described and is directed to hot surfaces by means such as nozzles in the rotor oil supply passages. Hot oil is drained out of the space through an impact tube similar to tube 326 only of larger capacity and is routed back to the oil pan.

It should be readily apparent that upon smaller engines a less elaborate oil circulating system may be devised, thus reducing number of oil passages needed to cool the engine rotor 1.

It should be readily apparent that omission of bore 6c from shaft 6 (FIG. 1) allows the use of the crankshaft 6 for oil passages to and from rotor 1 and simplifies this oil supply system.

As best illustrated in FIG. 2 of the drawing, a pulley 340 is secured by means of screws 340a to balancer 342 which is rigidly secured to end 6a of shaft 6 by splines 339 and screws 341 to drive accessories or machines secured to the engine. End 6b of shaft 6 has a flanged hub 344 rigidly secured thereto by means of splines 339a and screws 341a. Flanged hub 344 has spaced apertures 346 therein to allow attachment of a fly wheel or other means such as a transmission to drive a rotating mechanism. A housing 348 is secured to block 8 to provide protection to said fly wheel or transmission attachment.

An air intake check valve 352 is secured to valve housing 350 and communicates with the interior space 202 of each C-E valve 10a–10c and divider valve 12a–12c to admit air thereinto. To release pressure behind the C-E valves and divider valves, a relief check valve 354 is mounted on housing 350 and communicates with tube 356 which communicates with exhaust manifold 278. Although pollution is at a minimum because of the design of the engine, valves 354 and 352 are in compliance with the Environmental Protection Agency guide lines and regulations for crankcase ventilation. Intake check valve 352 may communicate with the air filter (not shown) to reduce objectionable contaminants into the engine. Hangers 345 and 345a are provided to secure the engine to its mounting blocks.

It should be readily apparent that the position of the C-E valves and divider valves may be varied as to their angle to the shaft 6 and rotor 1 in accordance with the design, size and performance desired of the engine.

FIRST MODIFIED EMBODIMENT

Figure 56:
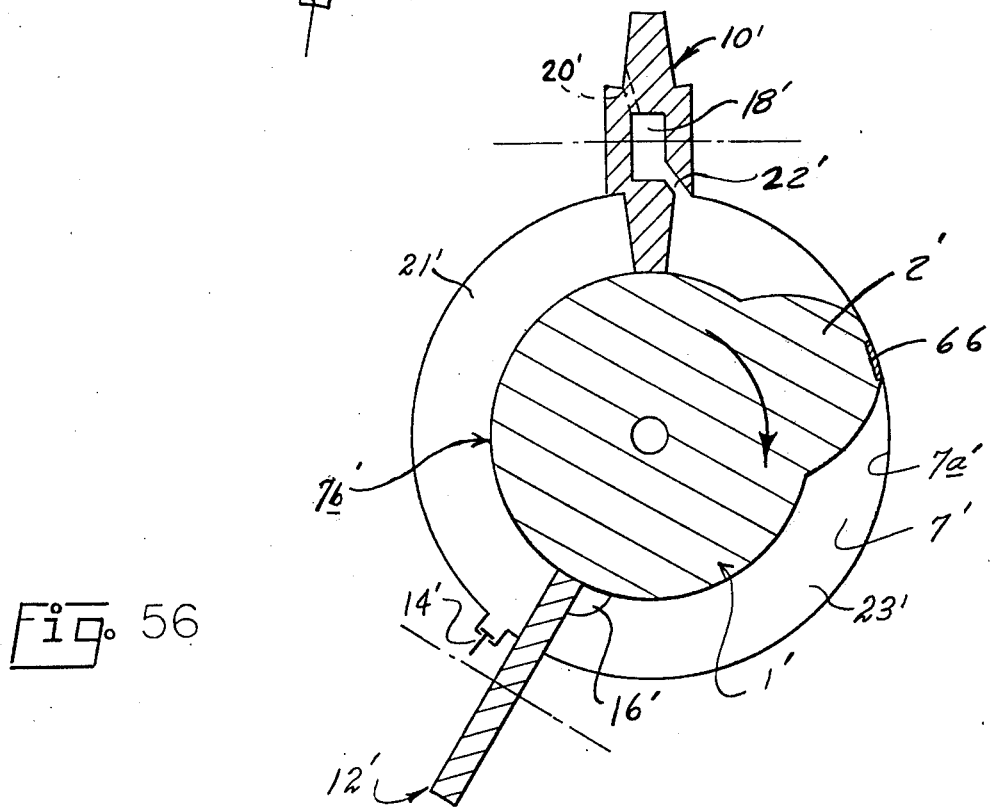
FIG. 56 is a diagrammatic view of a single-piston rotor.

FIGS. 47, 48 and 56 show a single rotor 1' having a single piston 2' which rotates about a shaft 6' such that piston 2' is in sealing engagement with torus wall 7a'. The cross-sectional contour of torus wall 7a' is substantially the same as of torus wall 7a heretofore described. The rotor 1' has essentially the same components as rotor 1, except for one less piston. Shaft 6' and rotor 1' are supported in block 8' by means of bearings 42' and 42a'. A pair of counterweights 335 are securely attached to shaft 6' on either side of rotor 1' as a means of balancing the weight of piston 2' on rotor 1'.

Gear 88' drives idler gears 90' which in turn drive gears 94' and 92' rigidly secured to shafts 102' and 104' which are secured to bevel gears 106' and 108' respectively. Bevel gear 108' drives bevel gear 112' which drives shaft 114' which is rigidly secured to divider valve 12' which is of substantially the same configuration as previously described divider valves 12a – 12c.

Bevel gear 106' drives bevel gear 110' which drives shaft 116' which is secured in block 8' by means of line bearings 120' and 148' and thrust bearing 118'. Shaft 116', fitted with counterweight 122' is connected to C-E valve 10', which is of substantially the same embodiment of the previously described C-E valves 10a, 10b and 10c.

Divider valve 12' and C-E valve 10' are in sealing engagement with the rotor 1' assembly dividing the torus 7' into gas working spaces 21' and 23'. The piston 2' performs the engine cycle functions as heretofore described.

SECOND MODIFIED EMBODIMENT

FIGS. 47 and 49 illustrate a second embodiment in which multiple rotors are used on a single crankshaft. Rotors 1'' and 1a'' are an integral part of shaft 6''. Each rotor 1'' (or 1a'') with a piston 2'' and respective divider valve 12'', C-E valve 10'' and torus 7'' have a relationship and operate as heretofore described for the first modified embodiment. The two rotors 1'' and 1a'' are arranged with the large diameter ends of the rotors back to back so that the end thrust of the two rotors will generally counteract each other. The single piston 2'' on rotor 1'' is located 180° from piston 2a'' on rotor 1a'' so that they will balance each other. Counterweights (not shown) may be secured to the crankshaft on either side of the pair of rotors to further balance the rotating assembly.

Divider valves 12'' and 12a'' have a common drive train from drive gear 88''. Gear 88'' drives idler gear 90'' secured to frame 100''. Idler gear 90'' drives gears 92'' which is rigidly secured to shaft 104'' and which drives bevel gears 108'' and 108a'' which drive the respective divider valves 12'' and 12a'' of this embodiment by bevel gears 112'' and 112a''. The divider valve assemblies 12'' and 12a'' are essentially the same as heretofore described for the first modified embodiment.

For the C-E valve assemblies 10'' and 10a'' the gear 88' drives idler 90' which drives gear 94' which is rigidly attached to shaft 102". Shaft 102" has bevel gears 106" and 106a" which are in an arrangement as shown for divider valve drive shaft 104" and which drive bevel gears 110" and 110a". Bevel gears 110" and 110a" drive respective C-E valve assemblies 10" and 10a" as heretofore described.

A thrust bearing means such as roller bearing 46" and 46a" are located on the shaft 6" and in the block on either side of the pair of rotors 1" and 1a". The shaft 6" is supported by bearings 42" and 42a".

Sectionalized block inserts 8c' separate and form a seal with retainer seals 48a". Except as herein described the components of this modified form of engine are substantially the same as heretofore described.

It is readily apparent that this modified embodiment is an example of similar alternate engines having a multiplicity of rotors on one crankshaft. Also, it illustrates that each of these multiple rotors may have one or a multiplicity of pistons working in a torus with one or a multiplicity of working sections.

For multiple rotor engines heretofore described the centers of corresponding C-E and divider valves have been substantially in the same plane through the shaft. Alternate arrangements may be used including valve alignments for each successive rotor stagered by rotation about the shaft from said plane.

OPERATION

A starting means such as an electric starter motor may be attached to the engine to turn the fly wheel in a manner commonly known to the art and not shown herein.

For a fuel injection engine shaft 6 is rotated which rotates rotor 1 in a counterclockwise direction as viewed in FIG. 1 of the drawings and in turn rotates the timing gears for the C-E and divider valves.

As viewed in FIG. 52, piston 2 or rotor 1 moves through divider valve 12c and past intake valve means 14a drawing a vacuum on the intake valve means 14a. The feather valves 244 and 245 of intake valve 14a are opened by the reduced pressure on gas working space 21a of the torus 7. Air is drawn from intake manifold 238 into the gas working space 21a through feather valves 244 and 245.

The forward face 38 of piston 2 compresses the air ahead of piston 2 through compression port 20a into combustion chamber 18a within C-E valve 10a. The C-E valve 10a forms a seal against the rotor 1 and piston 2 so that the gas is forced into combustion chamber 18a.

As the forward face 38 of piston 2 approaches the C-E valve 10a the C-E valve 10a rotates simultaneously until the notch in the valve is aligned with the piston 2 to allow the piston 2 to pass thereby. In doing so, the valve 10a follows the general slope of the piston 2 forward face 38 outward as rotor 1 and C-E valve 10a continue to rotate simultaneously.

Figure 53:
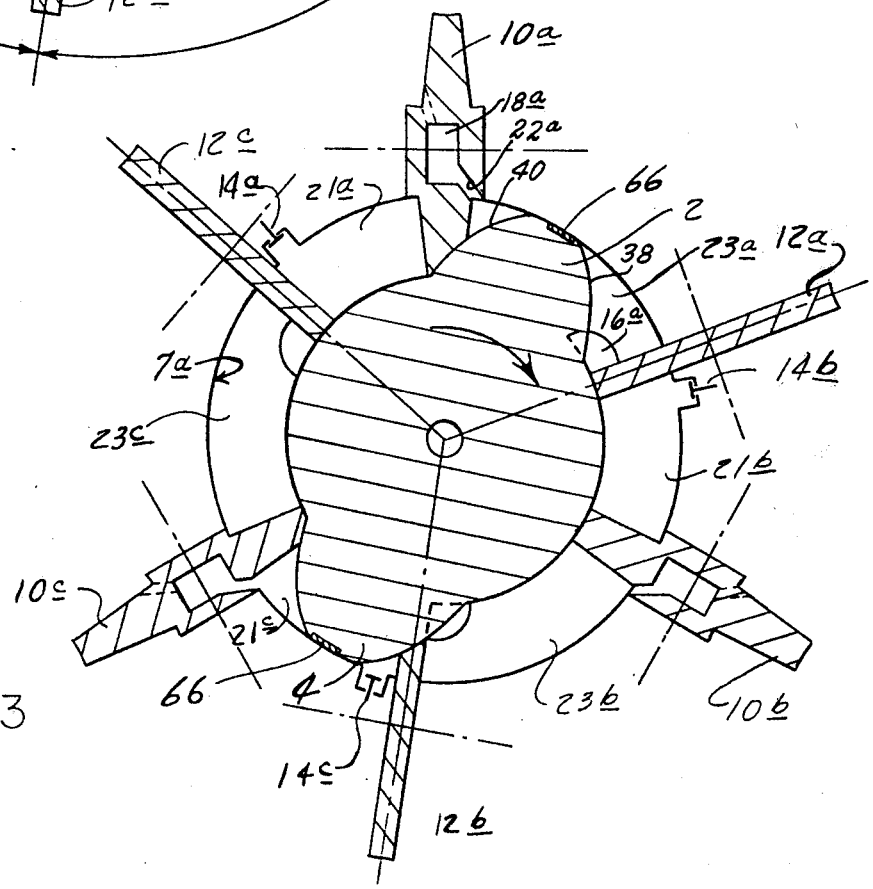
FIG. 53 is a diagrammatic view of the expansion-exhaust phase of piston 2.
Figure 55:
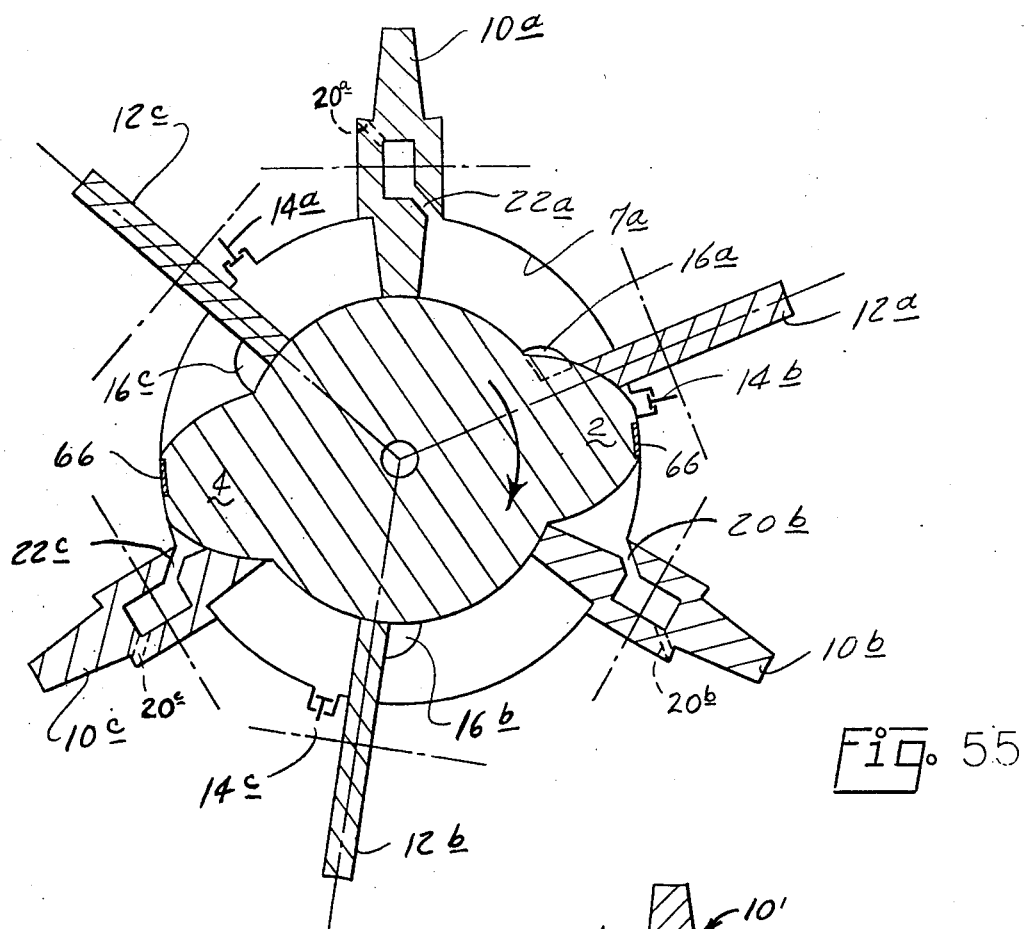
FIG. 55 is a diagrammatic view showing the intake-compression phase of piston 2.

As viewed in FIG. 53, the C-E valve 10a has rotated until compression port 20a is sealed off against the sealing surface 178 and expansion port passage 22a has opened to communicate with the gas working space 23a of torus 7. When the piston 2 reaches the point where intake ports 20a are closed, fuel is injected into combustion chamber 18a wherein ignition occurs by the heat of compression or by glow plug 170 and the gas mixture is combusted to produce high pressures. By the time pressures have built up substantially, expansion ports 22a are opening to allow the pressure to act against the trailing face 40 of the piston 2. Valve 10a continues to rotate against the general receding slope of trailing face 40 sealing against the piston 2 to cause the expanding gases from combustion chamber 18a to expand against the torus 7a and the trailing face 40 of piston 2. Because rotor 1 is rotating with shaft 6 the gases expanding against piston 2 produce a moment about the axis of shaft 6 thus producing torque on shaft 6.

The forward face 38 of piston 2 at the same time as expansion occurs is pressing the spent gases from the last piston pass against divider valve 12a which seals against the rotor 1 and piston 2, forcing the gases to exit out exhaust ports 16a. Piston 4 located 180° from piston 2 on rotor 1, is going through an intake compression phase identical to the previously described phase for piston 2, as the piston 2 goes through the combustion-exhaust phase.

Piston 2 passes intake valve 14a and compresses the air ahead of piston 2. When the compression ratio reduction valve 148 is in operation (not fully closed) a portion of the gas in gas working section 21a will be passed back to the intake manifold 238 to reduce the gas volume compressed, thus reducing the engine compression ratio and varying the performance of the engine.

As the valve drive train gears are rotating oil pump 284 is turned to provide oil pressure through the various oil passages to lubricate the moving parts, to cool torus wall 7a and pistons 2 and 4 of rotor 1 and energize the hydraulic pressure means 72 on slipper seal 66. Exhaust gases which should be fully burned because of the design are urged from the system through exhaust ports 16 passing into exhaust passages 276 which are connected to a common exhaust manifold 278.

It should be readily apparent from the foregoing that the two piston rotor 1 (FIG. 1) performs three power cycles per revolutions for each piston 2 and 4 which is six power cycles per revolution of the rotor 1 thereby providing a smooth operation of the engine.

For a fuel injection engine with a one piston rotor and one working section there is one power cycle per shaft revolution.

For a carburetor type engine, fuel-air mixture is ingested into the engine and processed to the combustion chamber a heretofore described for air. However, in the combustion chamber the compressed fuel-air mixture is ignited by a spark from a spark plug which is connected to an electrical distribution system of a type well known to the industry. Burning gases expand from the combustion chamber and against the trailing face 40 of a piston are later expelled into the exhaust system as heretofore described for a fuel injection engine.

THIRD MODIFIED EMBODIMENT

Figure 57:
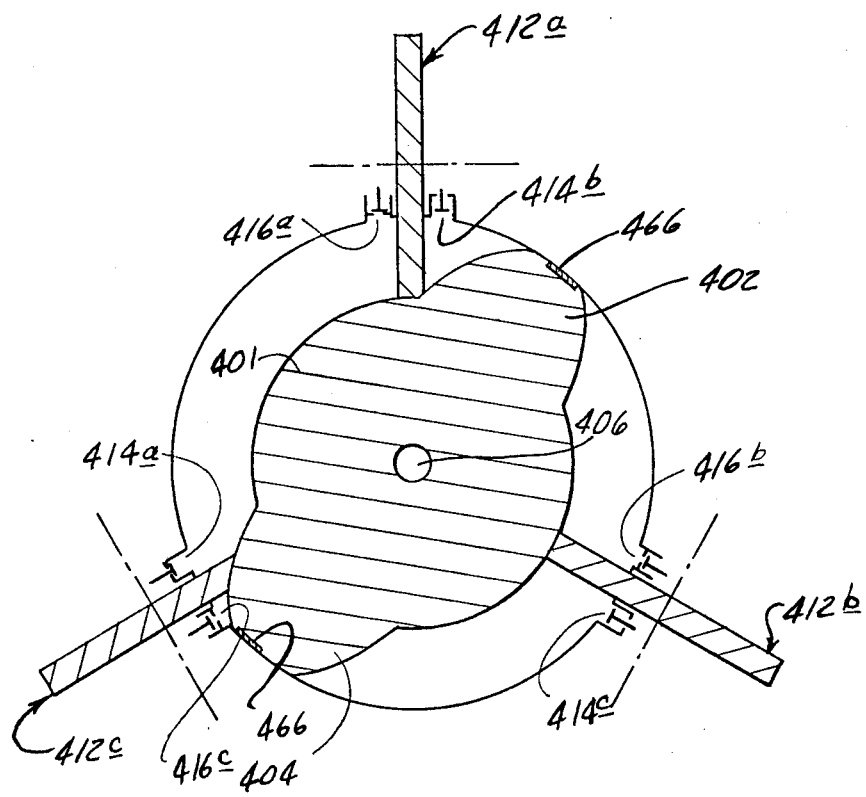
FIG. 57 is a diagrammatic view of a compressor.

A third modified form of this machine to be used as a compressor is illustrated in FIG. 57, in which one or more rotors 401 rotate on a common shaft 406. Each rotor has one or several pistons such as piston 402 and 404, and rotates in a torus 407. The torus 407 is divided into one or several working sections by divider valves 412a, 412b, and 412c in FIG. 57.

The shaft, rotor, pistons, divider valves and torus all have the same relationship with each other as heretofore described and form sealed working sections in the torus 407. Divider valves 412a–412c are located between inlet ports 414 and discharge ports 416 which correspond to intake ports 14a–14c and exhaust ports 116b′′′. Side 142′′′ is rigidly secured to side 134′′′ and is supported by bearing 148 rigidly secured to retainer 154′′′. Hot liner insert 150′′′ is spaced from side 134′′′ by spacer 156′′′ which is held from rotation by dowel pins 157′′′ and is supported by bearing 120′′′ secured to side 134′′′.

The combustion chamber 18b′′′ has a glow plug 170′′′ and a fuel injection nozzle 168′′′ communicating therewith through hot liner insert 150′′′, side 142′′′ and seal retainer spacers 165′′′ and 166′′′ are cooled and lubricated through passages 137′′′ and sealed by spring urged seal rings 135a′′′ formed in the ouer circumference of housing 150′′′. Compression port 20′′′ is closed the gas is ignited and upon rotation of C-E valve 10b′′′ expansion port 22′′′ communicates with gas working space 23b and torus 7 through parts 22a′′′ to allow the ignited gases to expand against the trailing face 40 of pistons 2 and 4.

The divider valves 12a–12c serve to separate the torus 7 into working sections A, B, and C (FIG. 52) thus dividing the intake and exhaust function of adjacent working sections of the engine.

Referring to FIG. 1, shaft 104b rotates mitered bevel gear 108b which rotates mitered bevel gear 112b, turning shaft 114b, which rotates divider valve 12b. Shaft 114b is supported at one end by thrust bearing 182 which maintains correct alignment of the valve casing. The valve assembly 12b is balanced by a counterweight 184 rigidly secured to shaft 114b to compensate for the cutaway notch 111 in the circular valve 12b. Bearing 186 suppots shaft 114 adjacent the divider valve 12b and is rigidly secured in block segments 8 and 9.

The divider valve 12b (FIGS. 23 and 24) consists of a three-section disc-body with a metal rim 188 and sides 190 and 191 with an insulation layer 192 therebetween to reduce the heat transmission between the two faces of the valve from the exhaust side of the valve to the intake side of the valve. Side 191 has a hub 194 which is rotatably secured in bearing 186 and is rigidly secured to shaft 114b by means of splined head 196 on the shaft end 114b.

Seal bars 198 form a seal about the periphery of the valve 12b to seal against the liner 60 of body 30 and pistons 2 and 4 of rotor 1, and are held in place by the interconnection of lugs 199 with grooves 199a formed in metal rim 188.

A second construction of the divider valve 12b′ is illustrated in FIG. 54 of the drawing comprising a two-section body with sides 190′ and 191′ having insulating layer 192′ therebetween. Side 191′ has a passage 191a′ therein through which shaft 114b is journalled and has splined head 196′ rigidly secured in a splined pocket formed in side 191′. Splined head 196′ also fits into a splined pocket formed in side 190′ to transfer part of the torque directly to side 190′.

The seal system is significantly different from that of divider 12b previously described in that grooves 197′ are formed in the outer circumference of divider valve 12b′ to form a labyrinth seal with a groove seal and cleaner which is mounted in block 8 to rake the grooves 197′ at the outer circumference of the valve (see FIG. 48a).

This labyrinth seal system also may be used for C-E valve (FIGS. 17 and 18). Labyrinth grooves are only applicable to the circular circumference of the valve. The ramps in the valve notches for both divider valve 12 and C-E valve 10 are by a multiplicity of spring urged L-shaped seal bars 163a and 164a held in position by retainer pieces 165 and 166 (FIG. 19). Said bars and retainers are similar to seals and retainers previously described, except that bars 163a and 164a have positioning lugs such as lug 164b held by matching notch 166b (FIG. 18). Means to seal, such as concentric circular grooves 195′ with spring urged seal rings are formed on the valve sides 190′ and 192′ to seal against the block segments 8 and 9 to prevent passage of oil and gas pressure. It is readily apparent that divider valve 12 can be fabricated without an insulating core and construction can otherwise be varied to meet the valve cooling requirements of a particular application. An alternate side of valve seal system for divider valve 12 is the slipper sealing system heretofore described for C-E valve 10.

An alternate arrangement of C-E valve 10 and divider valve 12 positioning (not shown) is for the valve drive shaft to be parallel to the tangent of torus 7 at the centerline of the compression port of C-E valve 10. The compression port outlet from the valve hub forms the contour of torus 7. At the expansion port outlet the valve hub is recessed in the block with block metal between it and torus 7. The expansion port connects to the torus 7 by a duct passage through this block metal.

As shown in FIGS. 1, 2, and 3 of the drawings, the air intake system includes air intake fitting 236 which may be connected to a forced air supply, an air filter, or a carburetor depending on the C-E valve configuration used.

The air intake system for the fuel injection C-E valve configuration 10b comprises an air intake fitting 236 on which an air cleaner (not shown) is fitted and communicates with hollow intake manifold 238 which extends outwardly from the rear portion of the engine and is rigidly secured to block segment 11 by means of bolts 240. The intake manifold 238 communicates with intake valves 14a, 14b, and 14c.

The intake valves 14a–14c comprise intake ports 242 which are regulated by valve means such as feather-type check valves 244 and 245. When a vacuum is drawn by pistons 2 or 4 of rotor 1 in gas working space 21a–21c, feather-valves 244 and 245 will open, thus allowing air to be drawn into the torus 7. Intake manifold 238 communicates with cavity 237 formed by cover 239 which is rigidly secured to block segments 8 and 9 and intake manifold 238 by means of screws 246 (FIG. 39).

An alternate valve means for use in ports adjacent to the divider valve 12 (not shown) consists of a valve system wherein the divider valve 12 hub is extended from the side of the valve disc to form a cylindrical shaped open ended valve gate to control gas flow to or from the torus 7. The inlet or outlet from this gate to the exterior of the engine is through the open end of the gate cylinder.

It should be readily apparent that the intake valves may be comprised of other configurations or a positive acting valve such as is already known in the art, or intakes means 14a–14c could be used without valves.

Adjacent to and communicating with intake manifold 238 is the compression ratio reduction means such as valve 248 (FIGS. 1 and 38). The compression ratio reduction valve 248 provides a means for reducing the volume of the gas drawn into gas working space 21a–21c thus reducing the compression ratio of the engine so that the engine may be more efficiently operated. The compression ratio reduction valve 248 allows air and fuel mixture to be controlled simultaneously or separately during the operation of the engine to meet different operating requirements of the engine. The compression ratio reduction valve 248 thus gives the engine better starting characteristics and optimum operation during various load conditions placed on the engine and helps to meet the Environmental Protection Agency requirements. regarding for engine pollutants.

The compression ratio reduction valve 248 comprises a circular shaped sliding valve gae 250 having ports 252 formed therein which align with inlet ports 254 which communicate with the interior of torus 7 through torus wall 7a. Adjustment means for sliding gate valve 250 comprises lever arm 256 which is rigidly secured to one end to sliding gate valve 250 and has the other end rigidly secured to shaft 258 by means of key 259. The shaft 258 is supported by bearings 260 and extends out of block segment 9 and is rigidly secured to lever 262 on the exterior side of the housing. A support arm 264 is secured to housing 266 to provide guide means for lever 262.

The compression ratio reduction valve levers 262 operate independently of each other or may be interconnected to a control system to operate concurrently. Automatic control with manual override may be provided by a commercially available system to activate the levers 262 to function or may be timed in accordance with the specific engine requirements.

It should be readily apparent that other types and configurations of valves can be used as a compression ratio reduction valve means.

When using the fuel injection configuration a retaining bar 270 rigidly secured by screws 272 to the side of the valve housing has fuel injection nozzle 168 inserted therethrough which may be connected to a fuel injection system (not shown); and the glow plug 170 inserted therethrough which provides sufficient heat for ignition of the fuel and air mixture when the proper quantities have beem mixed.

The C-E valve 10b'' illustrated in FIGS. 15 and 16 of the drawing will require a carburetor to be secured to intake fitting 236 so as to give the proper air-fuel mixture. The fuel will mix with incoming air in a manner well known in the art and the mixture is passed to the intake manifold 238. Ignition is by a spark plug and conventional spark ignition system.

Torus wall 7a has open exhaust ports 16a–16c formed in block segment 8 so that as pistons 2 and 4 approach divider valves 12a–12c the exhausted gases are forced outwardly through exhaust passages 276a, 276b, and 276c from the respective gas working spaces 23a–23c. The exhaust passages 276a–276c communicate with exhaust pipes 278 (FIG. 2) which connect to a conventional exhaust muffler system (not shown). Exhaust passage 276a is routed near gas intake manifold 238 and has a thermostatically controlld by-pass to a preheater 359 which surrounds the air intake horn of intake manifold 238 to heat the incoming air in a manner well known in the art.

As best illustrated in FIG. 3 of the drawings, the cooling system comprises a coolant inlet 280 from which coolant circulates through housing 5 as shown by the arrows in FIG. 3 and exists at coolant exist passage 282 through thermostatic well 283.

In order to equalize the engine metal temperatures the coolant generally circulates from the hottest part of the engine to the coldest part.

From the coolant intake passage 280, the coolant for working sections A and B circulates toward the center of the block segments 8, 9, and 11 about shaft 6 then passes through passages 280a to the circumferential jackets about torus wall 7a. Coolant for section C enters the cooling jacket of torus wall 7a near inlet 280. Coolane for all the sections surrounds torus walls 7a including each valve compartment. Circulation in the water jacket around torus wall 7a is generally in the circimferential direction relative to the shaft 6. Coolant leaves the jackets about torus wall 7a through passages 282a and into exit passage 282.

Inlet passage 280 and exit passage 282 are connected to a heat exchanger (not shown) which may consist generally of a circulating pump with a radiator core and fan for cooling purposes but is not intended to be limited thereto. The coolant liquid may be water in combination with commercially available anti-freeze solutions.

An alternate cooling means (not shown) may use air circulation over exteriorly finned surfaces of the engine block 8, 9, and 11 to cool the engine.

As best illustrated in FIGS. 1 and 2 of the drawings, the oil circulating means comprises an oil pump 284 having an oil screen 286 and a shaft 288 for driving the impeller means within the oil pump 284 which is rigidly secured to an angled spiral gear 290 which is in meshing relation with non-parallel spiral gear 292 which is connected to shaft 104c to provide driving force for the oil pump 284. Oil pump 284 is located in a lower portion of the engine so that gravity will provide a drain into the oil pan 294 which is rigidly secured to the block segment 9 by means of screws 293 and has threaded drain plug 296. A conventional type oil level dip stick 295 in dip stick tube 295a communicates with oil pan 294 as does oil filter pipe 285.

The oil pump 284 picks up oil through screen 286 and pumps it out through exit 298 where it may pass through a heat exchanger (not shown) such as through the liquid coolant heat exchanger to cool the oil. Oil inlet passage 300 communicates with the discharge side of the heat exchanger and passage 302 which communicates with oil filter means 304. Oil filter 304 may comprise a commercial filter element either of the cleanable metal or throw-away type.

Passage 306 communicates with oil filter 304 and with circular passage 308 which surrounds the main shaft 6. Passage 308 has numerous small passages 310 therein which carry oil to the main bearings and bearings of idling gears 90a–90c and 94a–94c and other small moving parts in the frontal portion of the engine to lubricate same.

Passage 316 is a large oil conduit from passage 308 to oil groove 86 in the hub 44 of rotor 1 to supply lubricating and cooling oil and a hydraulic pressure source of rotor 1. Passage 316b communicates with non-continuous oil groove 82 to provide one source of pressure for hydraulic actuator 72.

Figure 9:
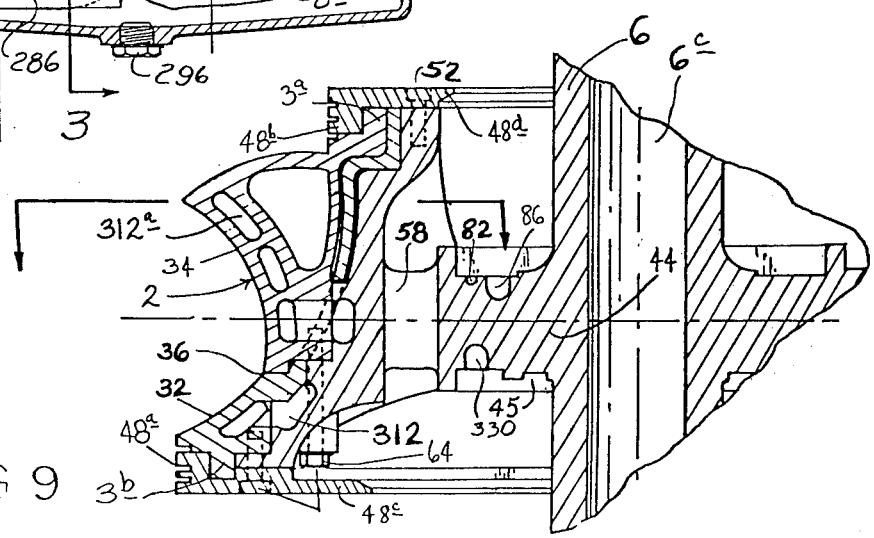
FIG. 9 is a fragmentary cross-sectional view taken along line 9—9 of FIG. 6.

Oil for rotor 1 is circulated from oil groove 86 through passage 322 to manifold 320 into oil passages 312 (FIGS. 6, 7, and 9). Passages 312 are primarily cooling oil passages but also distribute oil for lubrication. The passages 312 and 312a from the cooling jacket about the perimeter of rotor 1 and pistons 2 and 4. Oil circulates in a generally circumferential direction for one-half of rotor 1 on the piston 2 side, through passages 312, through passages 312a in the pistons 2, through passages 312b, through orifices 318, and into collecting header 320a. (FIGS. 6 and 7). Oil from collecting header 322a flows into circular passage 330

16a–16c of heretofore described rotary engine. Inlet ports 414 and discharge ports 416 each have a valving means such as a check valve that may be of the feather valve configuration. Each piston 402 and 404 has a slipper seal 466. A by-pass valve means (not shown) similar to a compression ratio reduction valve 148 may be used in the wall of the working section.

In operation as piston 402 passes valve 414b, the trailing face of piston 402 draws a vacuum on the valve 414b, drawing in the medium being processed (air, gas or liquid). The medium from the previous piston pass is forced out ahead of piston 402 through the discharge valve 416b. The cycle is repeated again through each working section by each piston on the rotor 401. The rotor 401 is connected to shaft 406 which is connected to a rotating power source (not shown) to drive the machine.

Except as noted this configuration is substantially the same as heretofore described.

Figure 58:
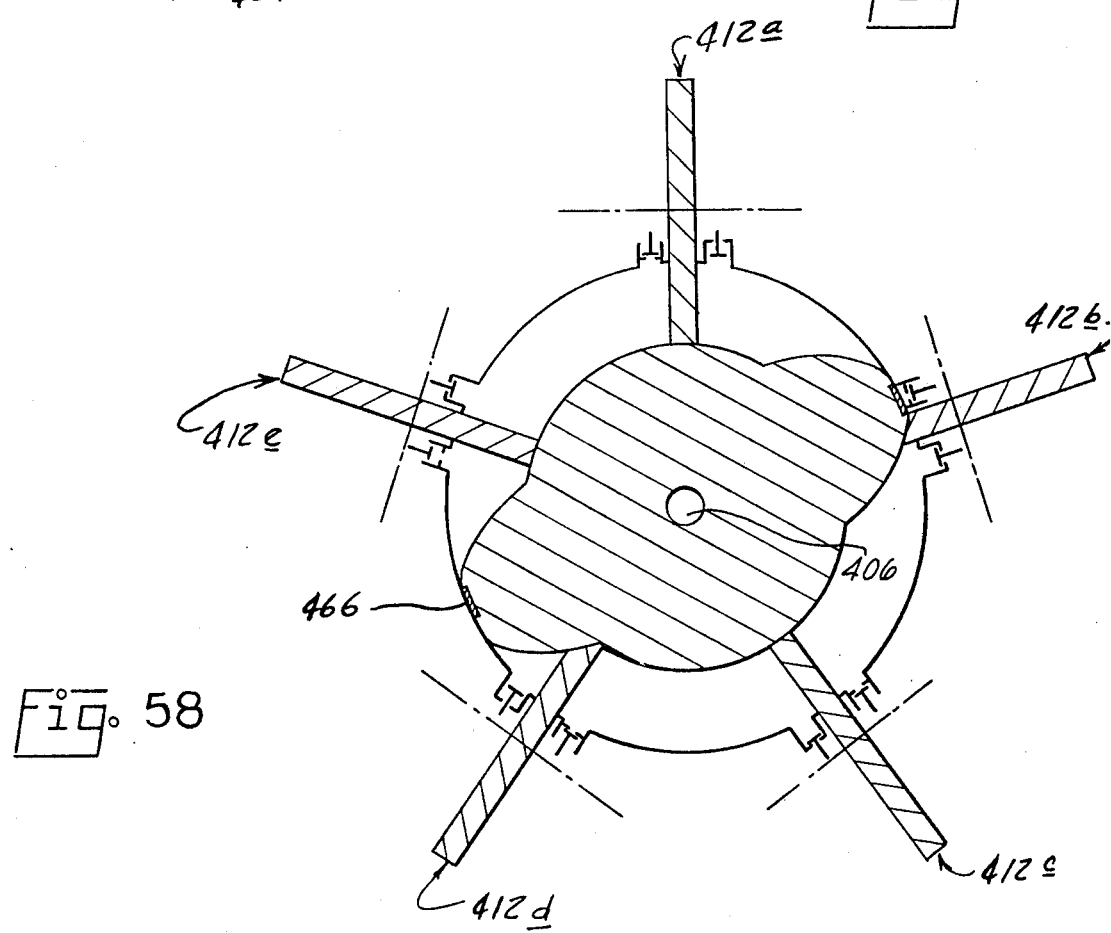
FIG. 58 is a diagrammatic view of a modified form of a compressor.

An alternate arrangement of the machine is illustrated in FIG. 58, in which a greater number of divider valves 412a, 412b, 412c, 412d, 412e, and 412f are provided to allow a lower volume per section and more uniform flow of the fluid than provided by the machine illustrated in FIG. 57. For compressable air or gas the machine in FIG. 58 produces a lower discharge pressure than the machine in FIG. 57.

An additional alternate of this machine configuration functions as a prime mover using an externally supplied energy source such as compressed air, pressurized liquid or steam when more pistons than working sections between valves 412 are used (not shown). The use of valves in the inlet and discharge ports is optional for a machine used as a prime mover.

Cylindrical valves as heretofore described are a suitable alternate for both the inlet valve 414a–414c and discharge valves 416a–416c of this third embodiment.

Machines of this third embodiment can be designed for use under a wide range of operating pressures. For high pressure use the divider valve 412a–412c may be constructed similar to C-E valve 10a–10c less combustion chamber, as shown in the preferred engine configuration to provide better sealing and a stronger valve.

The machines herein described under a third modified embodiment are suitable for use under higher operating pressures than many of the presently available machines which they will replace.

It should be readily apparent that other and further embodiments of my invention may be devised without departing from the basic concept of the invention. Various parts may be constructed with replaceable insert parts to facilitate maintenance and to increase engine life. However, for mass production of an inexpensive engine various parts may be cast as an integral part which is expendable. The seal structure may vary depending upon engine type and configuration as well as horsepower developed.

Having described my invention, I claim:

1. A rotary engine comprising: a hollow housing, the inner wall of which defines a portion of a torus shaped gas working space; a rotor rotatably mounted in the hollow housing having a truncated hyperboloid shape and which defines the interior wall of the torus shaped gas working space; seal means between said housing and said rotor; a piston extending outwardly from said rotor with the tip of said piston sealingly and slideably engaging the outer torus wall; a shaft rotatably supported in the housing and being secured to said rotor; a compression-expansion valve; means rotatably securing said compression-expansion valve in said housing, said compression-expansion valve extending into the torus shaped gas working space and rotatably engaging the rotor and pistons, said compression-expansion valve having a notch formed on the outer periphery thereof to allow the piston to pass through the notch; seal means on said compression-expansion valve urged into sealing engagement with said rotor; a combustion chamber in said compression-expansion valve with compression ports and expansion ports formed through the wall of said compression-expansion valve communicating with the combustion chamber and arranged to alternately communicate with the interior of the torus shaped gas working space upon rotation of said compression-expansion valve; a divider valve spaced from said compression-expansion valve arranged to form intake and exhaust sections in the torus shaped gas working space, said divider valve rotatably and sealingly engaging the rotor and pistons, said divider valve having a notch formed in the outer periphery thereof to allow the piston to pass thereby upon rotation thereagainst; drive means to cause the rotation of the compression-expansion valve and divider valve with relation to the rotor to cause the notches of the respective compression-expansion valve and divider valve to be aligned with the pistons when same are passing thereby; intake valve means provided in the inner wall of the housing communicating with the intake space of the torus shaped gas working space located adjacent the divider valve; exhaust ports provided in the inner wall of the housing located adjacent to and on the opposite side of the divider valve from the intake valve means; means to deliver fuel to the combustion chamber; and means to initiate combustion of fuel in said combustion chamber.

2. In a rotary engine: a hollow housing having an inner wall forming the outer wall of a circular working section; a shaft; a rotor secured to said shaft and rotatably disposed in the housing, said rotor having an outer surface forming the inner wall of the circular working section; seal means between said housing and said rotor; at least one piston formed on the rotor; a slipper seal on said piston, said slipper seal slideably contacting the outer wall of the working section; at least one divider valve; means rotatably securing said divider valve in said housing and arranged such that said divider valve rotatably contacts the surface of the rotor to form an end closure across said working section; at least one rotatable compression-expansion valve; means rotatably securing said compression-expansion valve in said housing arranged such that said compression-expansion valve rotatably contacts the surface of the rotor in spaced relationship to the divider valve and divides the working section into an intake-compression space and an expansion-exhaust space, a hub on said compression-expansion valve; a valve disc on said compression-expansion valve, said hub extending outwardly from said disc, said hub having a combustion chamber formed in the central portion of said hub, said hub further having compression ports to and expansion ports from the combustion chamber, the compression ports terminating in the hub perimeter on one side of the valve disc and the expansion ports terminating in the hub perimeter on the opposite side of the valve disc, said compression ports to the combustion chamber being alternately opened to communicate with the intake-compression space and alternately closed by rotatively engaging the housing, said expansion ports from the combustion chamber being alternately opened to communicate with the expansion-exhaust space and laternately closed by rotatively engaging the housing; a fuel intake valve communicating with said intake-compression space; means to deliver fuel to said fuel intake valve; means to initiate combustion in said combustion chamber; an exhaust port communicating with the expansion-exhaust space; and drive means between the rotor and the compression-expansion valve and divider valve to rotate the said valves in timed relationship to the rotor.

3. The combination called for in claim 2 wherein the rotor is in the shape of a truncated hyperboloid.

4. The combination called for in claim 2 wherein the compression-expansion valve and the divider valve rotate about axes which are substantially parallel to tangents to the circular working section.

5. The combination called for in claim 2 wherein the compression port and the expansion port to the combustion chamber in the compression-expansion valve are alternately closed and opened by rotatable contact with the housing wall.

6. The combination called for in claim 2 wherein the compression-expansion valve and divider valve each has a notch on the outer periphery thereof arranged to allow the piston to pass through the notch upon relative rotation of the rotor and each of said valves.

7. The combination called for in claim 2 wherein the circular working section is enclosed by surfaces of modified tubular torus shape.

8. The combination called for in claim 7 with the addition of timing means associated with the drive means to cause the piston to coincide with the notches upon rotation thereof.

9. The combination called for in claim 2 wherein both the divider valve and the compression-expansion valve are in continuous sealing relationship with the rotor and the pistons thereon.

10. The combination called for in claim 2 with the addition of seal means on sides of the divider and compression-expansion valves; means urging said seal means into sealing relationship with the valve housing near the inner surface of the working section.

11. The combination called for in claim 2 wherein said divider valve has a groove formed about the periphery thereof; and with the addition of a seal bar in said groove; and means urging said seal bar into sealing relation with the surface on the rotor.

12. The combination called for in claim 2 wherein said compression-expansion valve has an L-shaped groove formed in the periphery thereof; an L-shaped seal bar in said L-shaped groove; and means urging said L-shaped seal bar into sealing relation with the surface of the rotor.

13. The combination called for in claim 2 with the addition of: a plurality of pistons on said rotor.

14. The combination called for in claim 2 with the addition of: a plurality of rotors secured to said shaft.

15. The combination called for in claim 2, with the addition of: first seal means; means securing said first seal means to said divider valve such that said first seal means slidingly engages said rotor and said piston; second seal means; and means securing said second seal means to said compression-expansion valve such that said second seal means slidingly engages said rotor and said piston.

16. The combination called for in claim 15, said first and second seal means comprising: curved seal bars; lugs on said seal bars, said divider valve and said compression-expansion valve having an L-shaped groove formed in the periphery thereof, said lugs on said seal bars extending into said L-shaped groove.

17. In a compressor; a hollow housing having an inner wall forming the outer wall of a circular working section; a shaft; a rotor secured to said shaft and rotatably disposed in the housing, said rotor having an outer surface forming the inner wall of the circular working section; seal means between said housing and said rotor; at least one piston formed on the rotor; a slipper seal on said piston, said slipper seal slideably contacting the outer wall of the working section, a multiplicity of seal bars individually recessed in grooves in the piston perimeter surface, said seal bars being adapted to seal between the piston and the housing in a direction normal to the direction of rotation; means to urge said seal bars into sealing position against the housing; a slipper seal end recessed in the piston with the surface substantially flush with an adjoining piston surface; connector means to radially restrain said slipper end and allow circumferential movement of said slipper seal end; a grille plate connecting said seal bars, said grille plate connecting forward and trailing seal bars to said slipper seal end, said grille plate consisting of a multiplicity of narrow, generally circumferentially orientated, individually recessed and spaced runners arranged to provide slipper wearing surface continuity of the one piece slipper combination in a circumferential direction and substantially conforming to the adjoining piston surface contour, said recesses having sufficient clearance to accommodate slipper seal movement related to radial in and out movement of the seal bars and expansion and contraction; at least one divider valve; means rotatably securing said divider valve in said housing arranged such that said divider valve rotatably contacts the surface of the rotor to divide said working section into an intake space and a compression space; an intake port communicating with said intake space; an exhaust port communicating with the compression space; and drive means between the rotor and the divider valve to rotate the said valve in timed relationship to the rotor.

18. The combination called for in claim 17, with the addition of: valve means in said intake port, said valve means being adapted to admit fluid to said intake space and to prevent leakage of fluid from said intake space through said intake port.

19. The combination called for in claim 17 with the addition of: valve means in said exhaust port, said valve means being adapted to pass fluid out of said compression space and to prevent leakage of fluid into said compression space through said exhaust port.

20. In a rotary engine: a hollow housing having an inner wall forming a cylindrical hollow space therein; a rotor rotatably mounted in the housing, said rotor having an outer surface forming an inner wall of a hollow torus-shaped working space in the housing, said inner wall of the housing forming an outer wall of said hollow torus-shaped working space; a piston on the rotor; a slipper seal on said piston, said slipper seal slideably engaging the outer wall of the hollow torus-shaped working space; a divider valve; means rotatably securing said divider valve in said housing; means on said divider valve sealingly engaging the outer surface of the rotor; a compression-expansion valve; means rotatably securing said compression-expansion valve in said housing such that said compression-expansion valve is spaced from said divider valve and divides said working space in the housing into an intake-compression space and an expansion-exhaust space, said compression-expansion valve having a combustion chamber formed in the central portion thereof and further having compression ports to and expansion ports from the combustion chamber, the compression ports terminating on one side of the compression-expansion valve and the expansion ports terminating on the opposite side of the compression-expansion valve, said compression ports to the combustion chamber being alternately opened to communicate with the intake-compression section and alternately closed by rotatably engaging the housing; said expansion ports from the combustion chamber being alternately opened to communicate with the expansion-exhaust section and alternately closed by rotatably engaging the housing; seal means on said compression-expansion valve slidingly engaging the outer surface of said rotor; means to deliver fuel into said combustion chamber; means to initiate combustion in said combustion chamber; drive means between said rotor and said compression-expansion valve and said divider valve to rotate said compression-expansion valve and said divider valve and said rotor in timed relationship; and means communicating with said expansion-exhaust space to remove products of combustion therefrom.

21. The combination called for in claim 20, said means to initiate combustion in said combustion chamber comprising, a spark plug secured to said compression-expansion valve and extending into said combustion chamber; and means periodically delivering electric current to said spark plug.

22. The combination called for in claim 20, said means to deliver fuel into the combustion chamber comprising, a fuel injection nozzle positioned to inject fuel into said combustion chamber.

23. The combination called for in claim 20, said means to deliver fuel into said combustion chamber comprising, valve means in the wall of the housing to admit an air-fuel mixture to the intake-compression section such that upon rotation of said rotor the air-fuel mixture is compressed through said compression ports into said combustion chamber.

24. The combination called for in claim 20, said inner wall of the housing having an intake port formed therein communicating with said intake-compression section of said working space; and valve means in said intake port, said valve means being adapted to admit fluid to said intake-compression section and to prevent leakage of fluid from said intake-compression section through said intake port.

25. In a rotary engine: a hollow housing having an inner wall forming the outer wall of a circular working section; a shaft; a rotor secured to said shaft and rotatably disposed in the housing, said rotor having an outer surface forming the inner wall of the circular working section; seal means between said housing and said rotor; at least one piston formed on the rotor; a slipper seal on said piston, said slipper seal slideably contacting the outer wall of the working section; at least one divider valve; means rotatably securing said divider valve in said housing and arranged such that said divider valve rotatably contacts the surface of the rotor to form an end closure across said working section; at least one rotatable compression-expansion valve; means rotatably securing said compression-expansion valve in said housing arranged such that said compression-expansion valve rotatably contacts the surface of the rotor in spaced relationship to the divider valve and divides the working section into an intake-compression space and an expansion-exhaust space, said compression-expansion valve having a combustion chamber formed therein, and having at least one compression port movable to communicate between the intake-compression space and the combustion chamber and having at least one expansion port movable to communicate between the combustion chamber and the expansion-exhaust space; a fuel intake valve communicating with said intake-compression space; a fuel intake manifold having a cavity to deliver fuel to said fuel intake valve; compression ratio reduction means communicating between the fuel intake manifold cavity and the intake compression space, said compression ratio reduction means being adapted to reduce the volume of gas drawn into and retained in the intake compression space by the piston; means to initiate combustion in said combustion chamber; an exhaust port communicating with the expansion-exhaust space; and drive means between the rotor and the compression-expansion valve and divider valve to rotate the said valves in timed relationship to the rotor.

26. In a rotary engine: a hollow housing having an inner wall forming the outer wall of a circular working section; a shaft; a rotor secured to said shaft and rotatably disposed in the housing, said rotor having an outer surface forming the inner wall of the circular working section; seal means between said housing and said rotor; at least one piston formed on the rotor; a slipper seal on said piston, said slipper seal slideably contacting the outer wall of the working section; at least one divider valve; means rotatably securing said divider valve in said housing and arranged such that said divider valve rotatably contacts the surface of the rotor to form an end closure across said working section; at least one rotatable compression-expansion valve; means rotatably securing said compression-expansion valve in said housing arranged such that said compression-expansion valve rotatably contacts the surface of the rotor in spaced relationship to the divider valve and divides the working section into an intake-compression space and an expansion-exhaust space, said compression-expression valve having a combustion chamber formed therein, and having at least one compression port movable to communicate between the intake-compression space and the combustion chamber and having at least one expansion port movable to communicate between the combustion chamber and the expansion-exhaust space; a fuel intake valve communicating with said intake-compression space; means to deliver fuel to said fuel intake valve; means to initiate combustion in said combustion chamber; an exhaust port communicating with the expansion-exhaust space; and drive means between the rotor and the compression-expansion valve and divider valve to rotate the said valves in timed relationship to the rotor, wherein the rotor comprises: a rotor perimeter face having a concave shape conforming to the similar perimeter edges of the respective compression-expansion and divider valves, said perimeter face having one end of lesser diameter than the opposite end, and said pistons on said rotor having a gradual transition from the rotor perimeter face to the piston sealing tip consisting of a curved surface ramp having a contour as defined by the movement of the valve notch of the compression-expansion and divider valves such that the rotor and piston ramps provide a continuous sealing contact between the respective surfaces of the rotor and piston and the respective surfaces of the compression-expansion and divider valves through the full rotation and speed range of the rotor and valves.

27. In a rotary engine: a hollow housing having an inner wall forming the outer wall of a circular working section; a shaft; a rotor secured to said shaft and rotatably disposed in the housing, said rotor having an outer surface forming the inner wall of the circular working section; seal means between said housing and said rotor; at least one piston formed on the rotor; at least one divider valve; means rotatably securing said divider valve in said housing and arranged such that said divider valve rotatably contacts the surface of the rotor to form an end closure across said working section; at least one rotatable compression-expansion valve; means rotatably securing said compression-expansion valve in said housing arranged such that said compression-expansion valve rotatably contacts the surface of the rotor in spaced relationship to the divider valve and divides the working section into an intake-compression space and an expansion-exhaust space, said compression-expansion valve having a combustion chamber formed therein, and having at least one compression port movable to communicate between the intake-compression space and the combustion chamber and having at least one expansion port movable to communicate between the combustion chamber and the expansion-exhaust space; a fuel intake valve communicating with said intake-compression space; a slipper seal on said piston, said slipper seal slideably contacting the outer wall of the working section, said slipper seal comprising: a multiplicity of seal bars, said seal bars each being positioned in a groove formed in said piston; a flexible metal grille plate having series of slots formed therein; means connecting said grille plate to said seal bars such that the metal grille plate provides narrow surfaces between the slots running in a general circumferential direction relative to the rotor thus providing a surface of continuity to prevent the seal bars from interfering with the valve seal means on the compression-expansion valve and divider valves, and the edges of the valve housings, said seal bars and adjacent grille plate being adapted to be urged outwardly to engage the inner wall of the housing to form a seal; and attachment means to movably secure the ends of the grille plate to the piston; means to deliver fuel to said fuel intake valve; means to initiate combustion in said combustion chamber; an exhaust port communicating with the expansion-exhaust space; and drive means between the rotor and the compression-expansion valve and divider valve to rotate the said valves in timed relationship to the rotor.

28. The combination called for in claim 27 wherein the means to urge said seal bars comprises: a spring adaped to urge said seal bar outwardly.

29. The combination called for in claim 27 wherein the compression-expansion valve and the divider valves have similarly shaped notches, said notches having a gradually curved configuration, said gradually curved configuration being defined to mate with the gradual curved transition formed by the rotor to piston ramp to provide a continuous seal between the valves and the rotor.

30. The combination called for in claim 27 wherein the seal bars have slots formed therein normal relative to the inner wall of the housing to permit movement of the seal bar with the contour of the inner wall of the housing; a seal bar envelope having slots formed therein, said seal bar envelope slideably disposed over the bottom of the seal bar such that the slots of the seal bar and envelope are staggered to form a flexible seal.

31. The combination called for in claim 27 wherein the means to urge said seal bars comprises: hydraulic pressure means adapted to urge said seal bars and grille plate into pressure engagement with said inner wall of said housing.

32. The combination called for in claim 31 with the addition of said hydraulic pressure means being adapted to intermittently interrupt pressure on said seal bars and grille plate when the piston passes a compression-expansion valve and divider valve.

33. The combination called for in claim 32 with the addition of: an arm; means pivotally securing a central portion of said arm in the rotor; means securing a first end of said arm to said seal bar; and a counterweight on the second end of said arm.

34. The combination called for in claim 32 with the addition of: pressure fluid actuated means secured in said rotor; means securing said pressure fluid actuating means to said seal bar; and means to selectively deliver pressurized fluid to said pressure fluid actuated means such that the pressure fluid actuated means exerts pressure on the seal bar to cause said seal bar and adjacent grille plate to engage the inner wall of said housing.

35. In a rotary engine: a hollow housing having an inner wall forming the outer wall of a circular working section; a shaft; a rotor secured to said shaft and rotatably disposed in the housing, said rotor having an outer surface forming the inner wall of the circular working section; seal means between said housing and said rotor; at least one piston formed on the rotor, a multiplicity of seal bars individually recessed in grooves in the piston perimeter surface, said seal bars being adapted to seal between the piston and the housing in a direction normal to the direction of rotation; means to urge said seal bars into sealing position against the housing; a slipper seal end recessed in the piston with the surface substantially flush with adjoining piston surface; connector means to radially restrain said slipper end and allow circumferential movement of the slipper seal end; a grille plate connecting said seal bars, said grille plate connecting forward and trailing seal bars to said slipper seal end, said grille plate consisting of a multiplicity of narrow, generally circumferentially oriented, individually recessed and spaced runners arranged to provide a bridging surface of the slipper seal in a circumferential direction to bridge the openings in the housing, said runners substantially conforming to the adjoining piston surface contour, said recesses having sufficient clearance to accommodate slipper seal movement related to radial in and out movement of the seal bars and expansion and contraction; at least one divider valve; means rotatably securing said divider valve in said housing and arranged such that said divider valve rotatably contacts the surface of the rotor to form an end closure across said working section; at least one rotatable compression-expansion valve; means rotatably securing said compression-expansion valve in said housing arranged such that said compression-expansion valve rotatably contacts the surface of the rotor in spaced relationship to the divider valve and divides the working section into an intake-compression space and an expansion-exhaust space, said compression-expansion valve having a combustion chamber formed therein, and having at least one compression port movable to communicate between the intake-compression space and the combustion chamber and having at least one expansion port movable to communicate between the combustion chamber and the expansion-exhaust space; a fuel intake valve communicating with said intake-compression space; means to deliver fuel to said fuel intake valve; means to initiate combustion in said combustion chamber; an exhaust port communicating with the expansion-exhaust space; and drive means between the rotor and the compression-expansion valve and divider valve to rotate the said valves in timed relationship to the rotor.

36. The combination called for in claim 35 in which the slipper seal end is shaped wih a fingered end that engages corresponding finger recesses in the piston.

37. The combination called for in claim 35 with the addition of: the seal bars of the slipper seal being spring urged against the housing surface.

38. The combination called for in claim 35 wherein each seal bar has slots extending part way from the bottom of the seal bar toward the grille plate as a means to provide flexibility along the length of the seal bar; a seal bar envelope of substantially U-shaped flat bottomed cross section with slots part way from the open side towards the bottom of the U to provide flexibiliy along the envelope; slots in the seal bar and slots in the envelope staggered so that the bar slots and envelope slots do not occur at the same location; the envelope being slidably disposed over and secured to the seal bar.

39. The combination called for in claim 35 with the addition of: an extension seal means formed on the ends of the seal bars recessed in the rotor to form a circumferential seal at the ends of the rotor face to complete the piston seal means continuity.

40. The combination called for in claim 35 in which the extension seal means comprises: a spring to urge the extension seal means outwardly, said extension seal means each having a forked end to straddle the end of a seal bar.

41. The combination called for in claim 35 in which the runners on said grille plate are formed at an angle to a plane normal to the rotor shaft to equalize surface wear in the engine block.

42. The combination called for in claim 35 wherein the means to urge said seal bars comprises: a spring adapted to urge at least one seal bar outwardly; a counterweight assembly comprising a counterweight; a pivoted lever; means adjustably securing said counterweight to said lever; means connecting at least one extension on the bottom of said seal bar to said lever; and hydraulic pressure means adapted to urge said seal bars and grille plate into pressure engagement with said inner wall of said housing.

43. The combination called for in claim 35 wherein the means to urge said seal bars comprises: a spring adapted to urge at least one seal bar outwardly; a counterweight assembly comprising a counterweight; a pivoted lever; means adjustably securing said counterweight to said lever; means connecting at least one extension on the bottom of said seal bar to said lever.

44. The combination called for in claim 43 in which the location of the counterweight location is adjustable on the counterweight arm.

* * * * *

UNITED STATES PATENT AND TRADEMARK OFFICE
CERTIFICATE OF CORRECTION

PATENT NO. : 4,013,046
DATED : March 22, 1977
INVENTOR(S) : Gail W. Kemp

It is certified that error appears in the above—identified patent and that said Letters Patent are hereby corrected as shown below:

In Column 27, line 4, change "laternately"

to -- alternately --.

Signed and Sealed this

Thirty-first Day of May 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 4,013,046
DATED : March 22, 1977
INVENTOR(S) : Gail W. Kemp

It is certified that error appears in the above-identified patent and that said Letters Patent are hereby corrected as shown below:

In Column 27, line 4, change "laternately"

to -- alternately --.

Signed and Sealed this

Thirty-first Day of May 1977

[SEAL]

Attest:

RUTH C. MASON
*Attesting Officer*

C. MARSHALL DANN
*Commissioner of Patents and Trademarks*